(12) United States Patent
Zhang

(10) Patent No.: US 11,137,603 B2
(45) Date of Patent: Oct. 5, 2021

(54) SURFACE-RELIEF GRATING WITH PATTERNED REFRACTIVE INDEX MODULATION

(71) Applicant: Facebook Technologies, LLC, Menlo Park, CA (US)

(72) Inventor: Bo Zhang, Kenmore, WA (US)

(73) Assignee: FACEBOOK TECHNOLOGIES, LLC, Menlo Park, CA (US)

( * ) Notice: Subject to any disclaimer, the term of this patent is extended or adjusted under 35 U.S.C. 154(b) by 0 days.

(21) Appl. No.: 16/447,095

(22) Filed: Jun. 20, 2019

(65) Prior Publication Data
US 2020/0400951 A1 Dec. 24, 2020

(51) Int. Cl.
G02B 27/01 (2006.01)
F21V 8/00 (2006.01)
G02B 27/00 (2006.01)

(52) U.S. Cl.
CPC ....... *G02B 27/0172* (2013.01); *G02B 6/0016* (2013.01); *G02B 6/0035* (2013.01); *G02B 6/0065* (2013.01); *G02B 27/0093* (2013.01); *G02B 2027/0178* (2013.01)

(58) Field of Classification Search
CPC ............ G02B 6/0016; G02B 27/0172
See application file for complete search history.

(56) References Cited

U.S. PATENT DOCUMENTS

| 6,351,334 B1 * | 2/2002 | Hsieh | G02B 5/1861 349/61 |
| 7,612,882 B2 * | 11/2009 | Wu | G03F 9/7049 356/401 |
| 8,233,218 B1 * | 7/2012 | Mossberg | G02B 5/1842 359/567 |
| 9,341,846 B2 * | 5/2016 | Popovich | G02B 5/3083 |
| 10,690,831 B2 * | 6/2020 | Calafiore | G02B 6/0046 |
| 2004/0190102 A1 | 9/2004 | Mullen et al. | |

(Continued)

FOREIGN PATENT DOCUMENTS

| EP | 2317511 | 11/2009 |
| KR | 20100080005 | 7/2010 |

(Continued)

OTHER PUBLICATIONS

International Application No. PCT/US2020/036332, Partial International Search dated Sep. 18, 2020.

(Continued)

*Primary Examiner* — Eric Wong
(74) *Attorney, Agent, or Firm* — Weaver Austin Villeneuve & Sampson LLP

(57) ABSTRACT

Techniques disclosed herein relate generally to surface-relief structures. In one embodiment, a surface-relief grating includes a plurality of grating ridges. The plurality of grating ridges includes a first set of grating ridges characterized by a first refractive index, and a second set of grating ridges interleaved with the first set of grating ridges and characterized by a second refractive index different from the first refractive index. The plurality of grating ridges is imprinted in a polymer layer by a nanoimprint lithography process and is exposed to a light pattern to form the first set of grating ridges and the second set of grating ridges that have different refractive indices.

14 Claims, 22 Drawing Sheets

(56) References Cited

U.S. PATENT DOCUMENTS

| | | | |
|---|---|---|---|
| 2005/0275944 A1 | 12/2005 | Wang et al. | |
| 2017/0192129 A1* | 7/2017 | Cunningham | C09K 11/02 |
| 2018/0081176 A1* | 3/2018 | Olkkonen | G02B 27/0081 |
| 2019/0227316 A1* | 7/2019 | Lee | G02B 6/0016 |

FOREIGN PATENT DOCUMENTS

| | | |
|---|---|---|
| WO | 2007057500 | 5/2007 |
| WO | 2012166460 | 12/2012 |
| WO | 2020256964 | 12/2020 |

OTHER PUBLICATIONS

PCT Application No. PCT/US2020/036332, "International Search Report and Written Opinion", dated Nov. 9, 2020, 15 pages.

\* cited by examiner

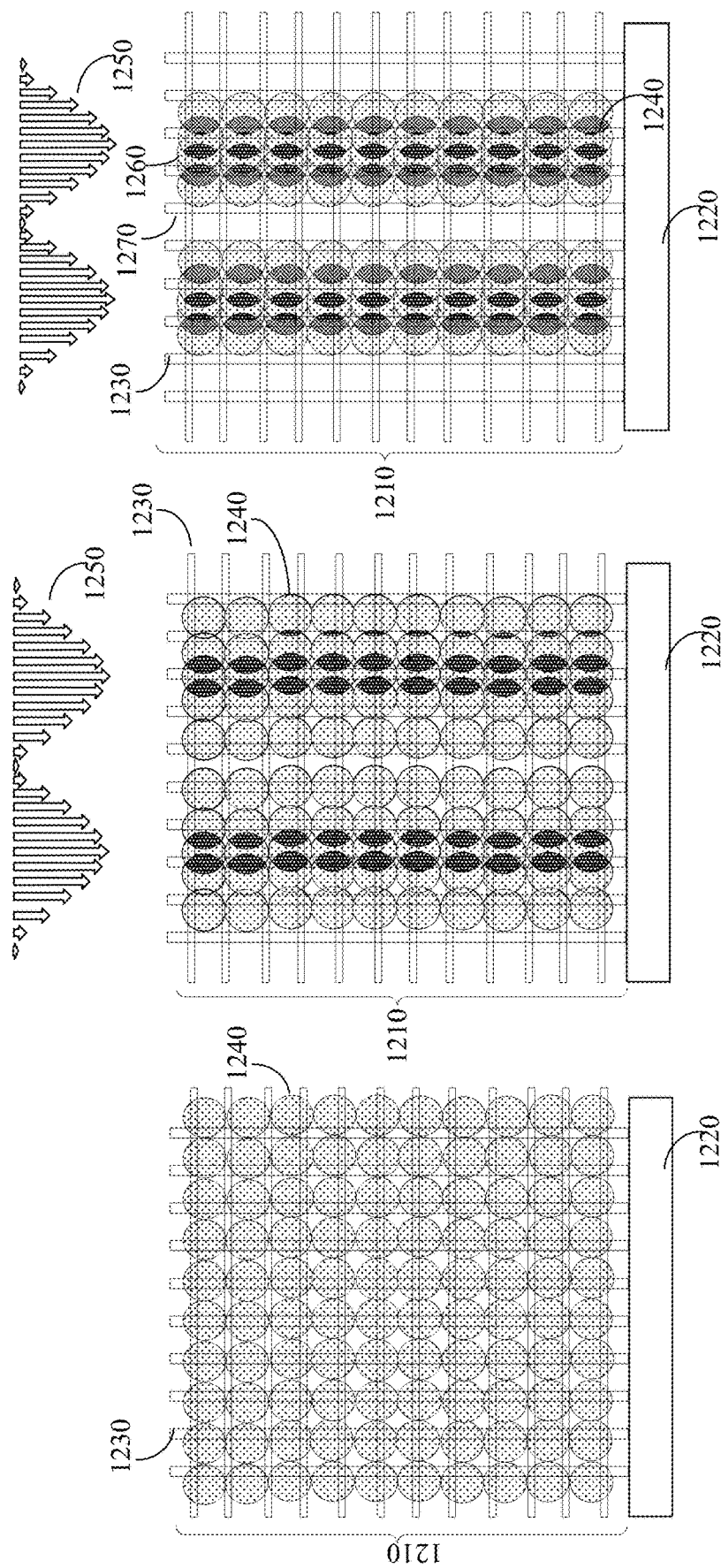

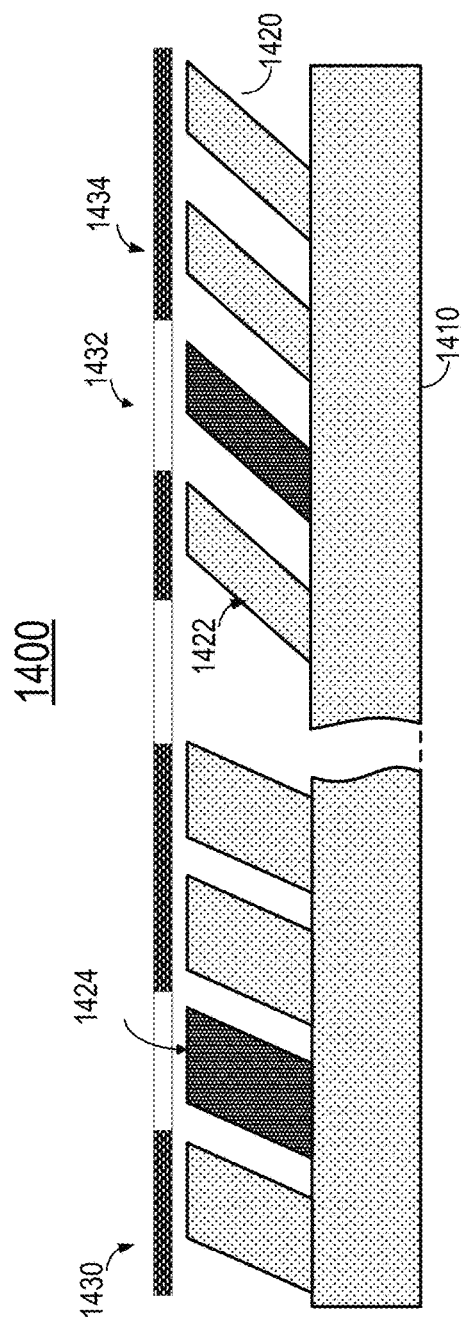
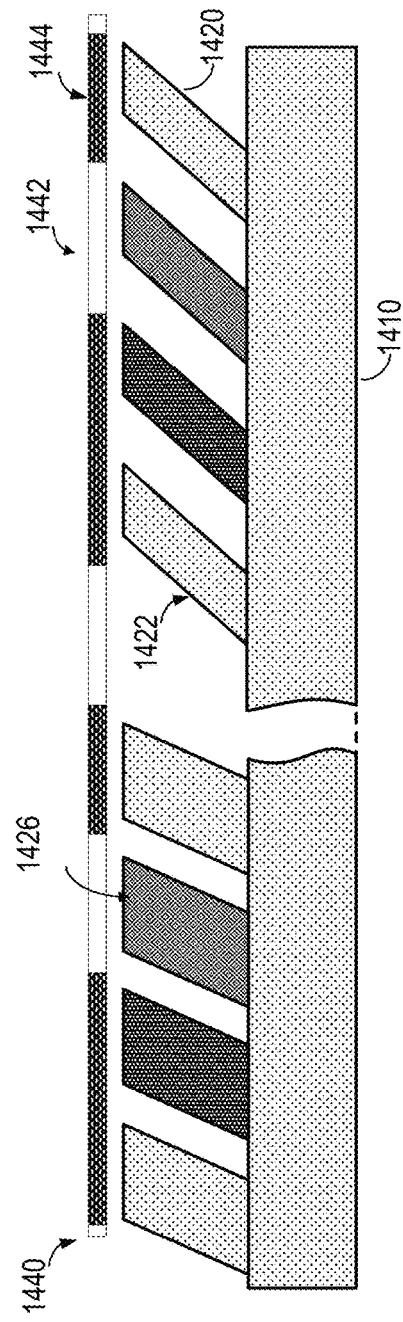
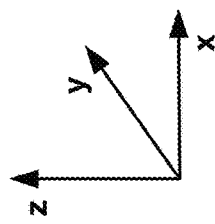

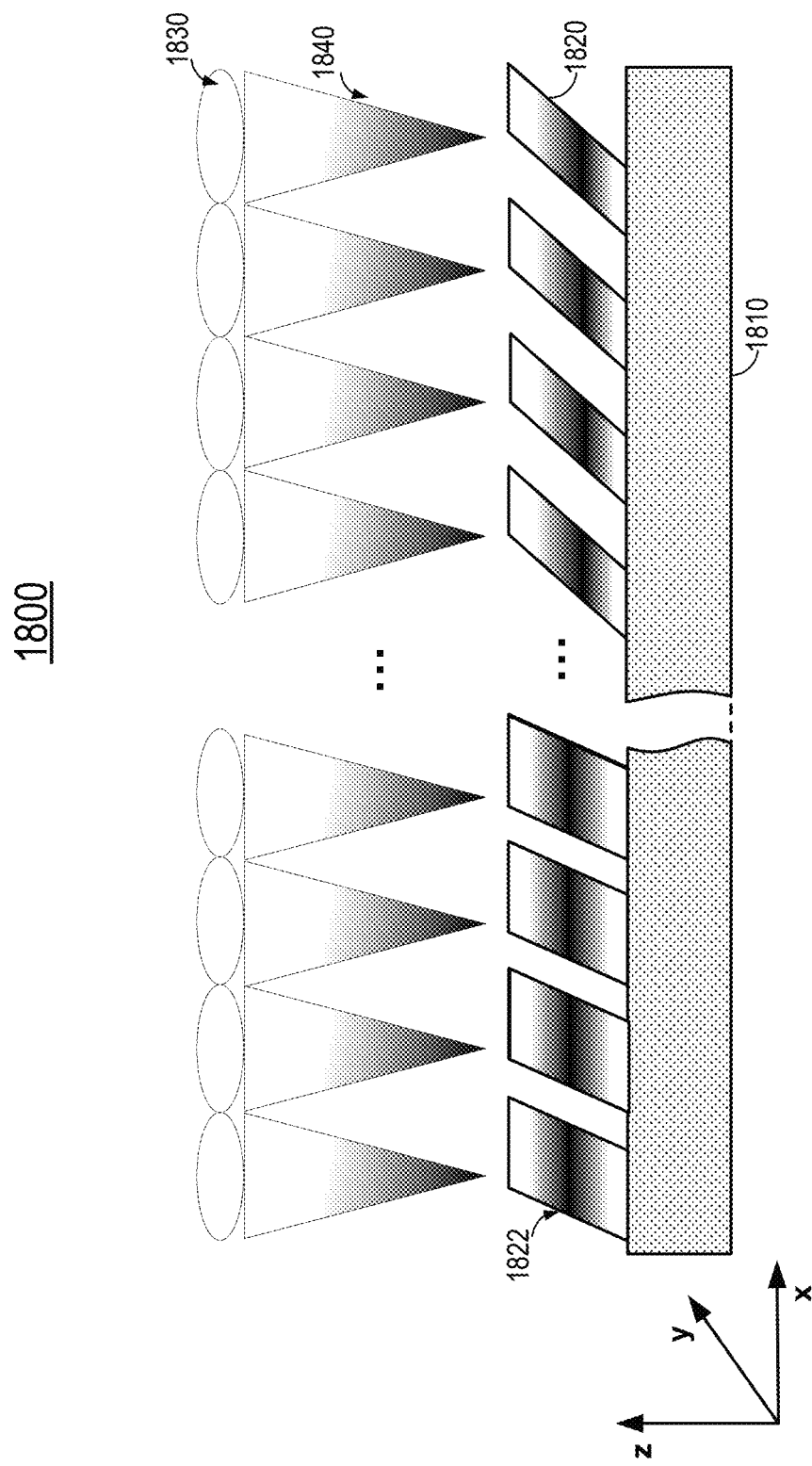

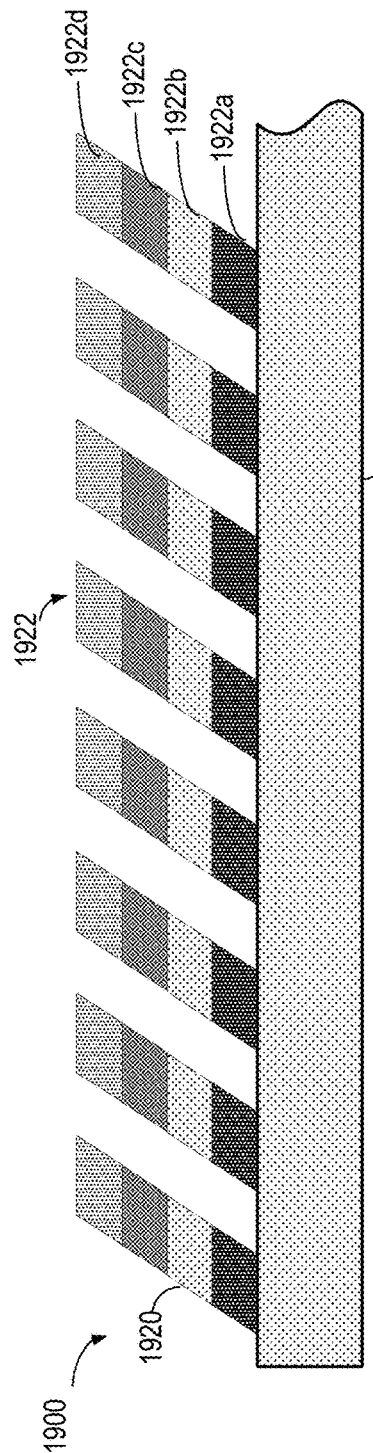
FIG. 19A
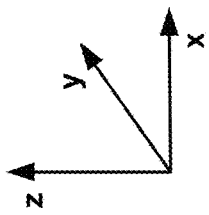
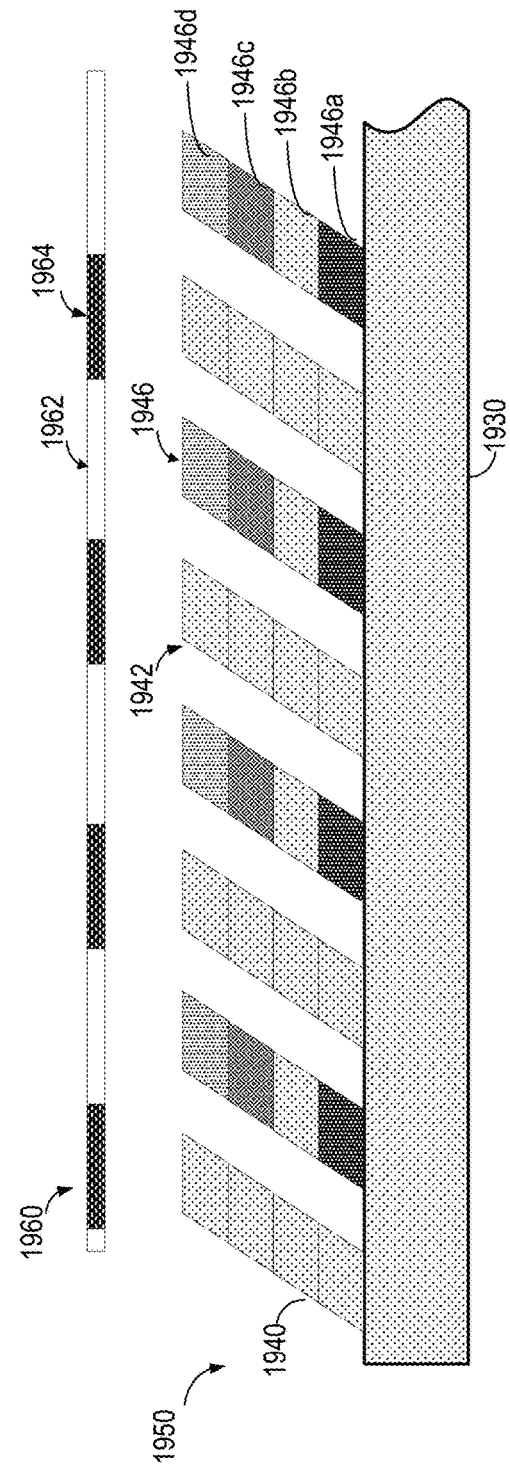
FIG. 19B

SURFACE-RELIEF GRATING WITH PATTERNED REFRACTIVE INDEX MODULATION

BACKGROUND

An artificial reality system, such as a head-mounted display (HMD) or heads-up display (HUD) system, generally includes a display configured to present artificial images that depict objects in a virtual environment. The display may display virtual objects or combine images of real objects with virtual objects, as in virtual reality (VR), augmented reality (AR), or mixed reality (MR) applications. For example, in an AR system, a user may view both images of virtual objects (e.g., computer-generated images (CGIs)) and the surrounding environment by, for example, seeing through transparent display glasses or lenses (often referred to as optical see-through) or viewing displayed images of the surrounding environment captured by a camera (often referred to as video see-through).

One example of an optical see-through AR system may use a waveguide-based optical display, where light of projected images may be coupled into a waveguide (e.g., a substrate), propagate within the waveguide, and be coupled out of the waveguide at different locations. In some implementations, the light of the projected images may be coupled into or out of the waveguide using a diffractive optical element, such as a straight or slanted surface-relief grating. The parameters of the surface-relief grating, such as the grating period, duty cycle, depth, slant angle, refractive index modulation, and the number of multiplexed gratings may need to be tuned and may need to vary individually or in combination across the area of the surface-relief grating, in order to achieve the desired performance, such as a wide field of view, wide optical bandwidth, high efficiency, pupil expansion, less artifacts, and desired angular selectivity. Fabricating surface-relief gratings with the desired grating parameters at a high fabrication speed and high yield remains a challenging task.

SUMMARY

This disclosure relates generally to techniques for fabricating surface-relief structures, such as straight or slanted surface-relief gratings used in a waveguide-based near-eye display system. More specifically, and without limitation, disclosed herein are techniques for fabricating a surface-relief structure having patterned refractive index modulation that may vary in one-dimension, two dimensions, or three dimensions, using nanoimprinting and selective curing techniques. Various inventive embodiments are described herein, including methods, systems, devices, and the like.

According to certain embodiments, a method may include imprinting, in an organic material layer including a photosensitive base resin that includes monomers, a surface-relief structure including a plurality of grating ridges, generating a light pattern that includes bright regions and dark regions, and exposing the surface-relief structure to the light pattern to polymerize the monomers in a set of grating ridges of the plurality of grating ridges in the bright regions and increase a refractive index of the set of grating ridges of the plurality of grating ridges in the bright regions.

In some embodiments of the method, an intensity of the light pattern may vary in one dimension, two dimensions, or three dimensions. In some embodiments, generating the light pattern may include illuminating a photomask or a diffractive optical device by a light beam having a uniform intensity in a cross-section of the light beam, or generating an interference pattern using two coherent light beams. In some embodiments, the light pattern may include a converging light pattern, and the light pattern may have a highest intensity in the set of grating ridges of the plurality of grating ridges in the bright regions.

In some embodiments, the method may also include generating a second light pattern, and exposing the surface-relief structure to the second light pattern. In some embodiments, the method may also include depositing an overcoat layer on the organic material layer, where the overcoat layer may fill regions between the plurality of grating ridges and have a refractive index different from the refractive index of the set of grating ridges.

According to certain embodiments, a surface-relief grating for a display system may include a polymer layer including a plurality of grating ridges. The plurality of grating ridges may include a first set of grating ridges characterized by a first refractive index, and a second set of grating ridges interleaved with the first set of grating ridges and characterized by a second refractive index different from the first refractive index. In some embodiments, the surface-relief grating may further include an overcoat material layer on the polymer layer and filling regions between the plurality of grating ridges. In some embodiments, the polymer layer may include nanoparticles with refractive indices greater than 1.7.

In some embodiments of the surface-relief grating, the plurality of grating ridges may include a slanted grating ridge. In some embodiments, the plurality of grating ridges may further include a third set of grating ridges interleaved with the first set of grating ridges and the second set of grating ridges and characterized by a third refractive index different from the first refractive index and the second refractive index. In some embodiments, the first set of grating ridges and the second set of grating ridges may be distributed in the polymer layer according to a one-dimensional pattern. In some embodiments, the first set of grating ridges and the second set of grating ridges may be distributed in the polymer layer according to a two-dimensional pattern. In some embodiments, a difference between the first refractive index and the second refractive index may be greater than 0.01. In some embodiments, the plurality of grating ridges may be imprinted in the polymer layer using a nanoimprint lithography process. In some embodiments, the plurality of grating ridges may be configured to couple light into or out of a waveguide in the display system.

According to certain embodiments, a surface-relief grating for coupling light into or out of a waveguide display may include a polymer layer including a plurality of grating ridges that includes a first set of grating ridges. Each grating ridge in the first set of grating ridges may include a first layer and a second layer. The first layer and the second layer may have different refractive indices. The surface-relief grating may also include an overcoat material layer on the polymer layer and filling regions between the plurality of grating ridges.

In some embodiments of the surface-relief grating, each grating ridge in the first set of grating ridges may include a plurality of layers that includes the first layer and the second layer. A refractive index of each grating ridge in the first set of grating ridges may be apodized in a direction along a thickness direction of the polymer layer. In some embodiments, the plurality of grating ridges may further include a second set of grating ridges interleaved with the first set of grating ridges, where the second set of grating ridges may be characterized by a refractive index profile different from a refractive index profile of the first set of grating ridges. In some embodiments, the first set of grating ridges may include a slanted grating ridge.

This summary is neither intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim. The foregoing, together with other features and examples, will be described in more detail below in the following specification, claims, and accompanying drawings.

BRIEF DESCRIPTION OF THE DRAWINGS

Illustrative embodiments are described in detail below with reference to the following figures.

FIG. 8A shows a molding process. FIG. 8B shows a demolding process.

FIG. 9A shows a master mold. FIG. 9B illustrates the master mold coated with a soft stamp material layer. FIG. 9C illustrates a lamination process for laminating a soft stamp foil onto the soft stamp material layer.

FIG. 9D illustrates a delamination process, where the soft stamp including the soft stamp foil and the attached soft stamp material layer is detached from the master mold.

FIG. 10A shows a waveguide coated with an imprint resin layer. FIG. 10B shows the lamination of the soft stamp onto the imprint resin layer. FIG. 10C shows the delamination of the soft stamp from the imprint resin layer. FIG. 10D shows an example of an imprinted slanted grating formed on the waveguide.

FIG. 12A schematically illustrates a nanoimprint material layer before photo curing.

FIG. 12B schematically illustrates a nanoimprint material layer being cured by a light pattern according to certain embodiments.

FIG. 12C schematically illustrates a nanoimprint material layer after being cured by a light pattern for a certain time period according to certain embodiments.

FIGS. 14A and 14B illustrate an example of a method of patterning the refractive index modulation in an imprinted slanted surface-relief structure using masks according to certain embodiments.

FIG. 18 illustrates an example of a method of varying the refractive index modulation in the thickness direction of an imprinted slanted surface-relief structure according to certain embodiments.

FIG. 19A illustrates an example of an imprinted slanted surface-relief structure with the refractive index modulation varying in the thickness direction according to certain embodiments.

FIG. 19B illustrates an example of an imprinted slanted surface-relief structure with the refractive index modulation varying in the thickness direction and the length and/or width directions according to certain embodiments.

Figure 1:
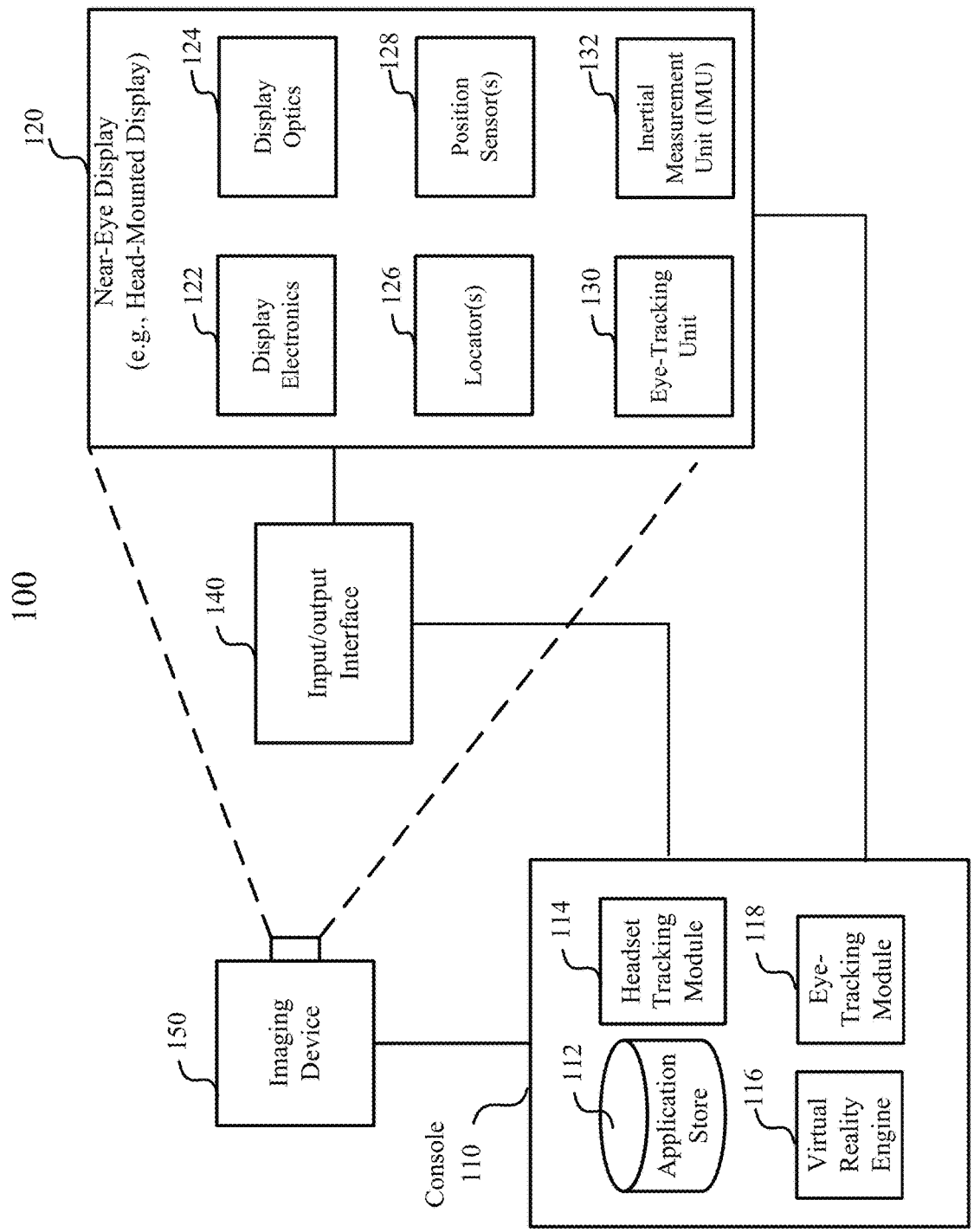
FIG. 1 is a simplified block diagram of an example of an artificial reality system environment including a near-eye display according to certain embodiments.

The figures depict embodiments of the present disclosure for purposes of illustration only. One skilled in the art will readily recognize from the following description that alternative embodiments of the structures and methods illustrated may be employed without departing from the principles, or benefits touted, of this disclosure.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Techniques disclosed herein relate generally to surface-relief structures, such as straight or slanted surface-relief gratings used in a waveguide-based near-eye display system. More specifically, and without limitation, this disclosure relates to techniques for manufacturing surface-relief structures with patterned refractive index modulation Δn (e.g., difference between the refractive index $n_1$ of a ridge and the refractive index $n_2$ of a groove) in one or more dimensions of the surface-relief structures. Techniques disclosed herein can be used to fabricate straight or slanted surface-relief gratings with desired three-dimensional refractive index profiles using nanoimprint lithography (NIL) and selective curing of imprinting materials. The surface-relief gratings can be used as, for example, waveguide couplers in waveguide-based displays to increase the optical bandwidth, improve the field of view, increase the brightness or contrast ratio of displayed images, increase power efficiency, and reduce display artifacts (e.g., rainbow artifacts) of the waveguide-based displays.

Grating couplers may be used in a waveguide-based near-eye display system for coupling display light into or out of a waveguide or for eye tracking. In some waveguide-based near-eye display systems, the grating coupler may include a straight or slanted deep surface-relief grating. In order to improve the optical performance of the waveguide-based near-eye display system, the grating coupler may need to have different diffraction characteristics at different regions of the grating. Thus, the grating period, the duty cycle, the grating depth, the slant angle, the refractive index modulation, and/or the manner of multiplexing multiple gratings may need to vary across the grating. For example, the refractive index modulation of the grating can be used to optimize the diffraction efficiency and/or the angular and spectral response of the grating. Therefore, in some applications, in addition to tuning other parameters of the grating, varying the refractive index modulation of the grating such that different regions of the grating may have different refractive index modulation, may help to selectively couple display light and ambient light into and out of the waveguide and into user's eyes, improve the field of view, increase the spectral bandwidth of the coupled light, increase brightness and overall efficiency, reduce display artifacts (e.g., rainbow artifacts), and improve other performances of the waveguide-based near-eye display system. For example, it may be desirable to integrate multiple gratings in a multiplexed grating for coupling light of different incident angles (or fields of view) and/or different wavelengths, where the multiple gratings may have different offsets and different refractive index modulation in at least one of the x, y, or z direction. In surface-relief gratings fabricated using nanoimprint lithography or etching, because a same material (e.g., resin or dielectric substrate) is generally used to fabricate the gratings, the refractive index of the grating ridges may be the same. Thus, while it may be relatively easy to make multiplexed holographic gratings, it may be difficult to make multiplexed surface-relief gratings or surface-relief gratings with different refractive index modulations at different regions using nanoimprint lithography or etching techniques.

According to certain embodiments, techniques for fabricating surface-relief gratings with a desired refractive index modulation pattern (e.g., interdigital pattern or multi-dimensional pattern) using NIL and selective curing are disclosed. In some embodiments, a light pattern may be used to selectively cure and polymerize different regions of the resin material in imprinted surface-relief gratings, where the light pattern may be generated using, for example, a photomask or the interference between two light beams. The amplitude of the refractive index modulation may depend on the dosage of the curing light used to polymerize the resin material. For example, a nanoimprinted surface-relief grating may be universally cured first by, for example, thermal curing or light (e.g., UV light) curing, to form a support matrix, and a light pattern may be used to illuminate the surface-relief grating to cure selected regions of the surface relief grating photochemically. The light pattern may cause the polymerization of monomers and thus refractive index changes in the exposed region of the resin material. In some embodiments, another light pattern (e.g., generated using another photomask or the interference between two other beams) may be used to cure other regions of the resin layer at different light doses. In this way, patterned refractive index modulation may be achieved in the length and/or width directions (e.g., the x-y plane) of the surface-relief grating. For example, the surface-relief grating may include two interleaved grating having different refractive index modulations.

In some embodiments, additional or alternatively, the refractive index modulation may vary in the thickness direction (e.g., z-direction) of the surface-relief grating, such that multiple gratings may be vertically multiplexed in the surface-relief grating, or a surface-relief grating with refractive index varying vertically in a grating ridge may be formed. For example, a light pattern or a uniform light beam may be projected onto the resin material, where the light pattern or the uniform light beam may be focused or diverged such that the intensity of the light beam may vary in the light beam propagation direction, such as the thickness direction of the surface-relief grating. As a result, the exposure dosage may vary in the thickness direction to cause different degrees of photopolymerization at different depths (in addition to different x-y locations) to more preferentially cure resin materials at certain heights or depths or to apodize the surface-relief grating. In some embodiments, the focusing or divergence of the light pattern and/or the curing time can be changed in a series of curing processes to cure resin materials at a different height or depth using a different exposure dosage in each curing process to achieve different refractive indices at different heights or depths of the grating.

In this way, surface-relief gratings with patterned (e.g., interleaved and/or vertically varying) refractive index modulation, such as 1-D, 2-D, or 3-D multiplexed gratings, may be made using nanoimprint lithography and selective photo curing performed before or after the demolding. The nanoimprint process and the curing process can take much less time than etching, and thus can be used to make surface-relief gratings having the desired grating parameters at a high productivity.

In the following description, for the purposes of explanation, specific details are set forth in order to provide a thorough understanding of examples of the disclosure. However, it will be apparent that various examples may be practiced without these specific details. For example, devices, systems, structures, assemblies, methods, and other components may be shown as components in block diagram form in order not to obscure the examples in unnecessary detail. In other instances, well-known devices, processes, systems, structures, and techniques may be shown without necessary detail in order to avoid obscuring the examples. The figures and description are not intended to be restrictive. The terms and expressions that have been employed in this disclosure are used as terms of description and not of limitation, and there is no intention in the use of such terms and expressions of excluding any equivalents of the features shown and described or portions thereof. The word "example" is used herein to mean "serving as an example, instance, or illustration." Any embodiment or design described herein as "example" is not necessarily to be construed as preferred or advantageous over other embodiments or designs.

FIG. 1 is a simplified block diagram of an example of an artificial reality system environment 100 including a near-eye display system 120 in accordance with certain embodiments. Artificial reality system environment 100 shown in FIG. 1 may include near-eye display system 120, an optional imaging device 150, and an optional input/output interface 140 that may each be coupled to an optional console 110. While FIG. 1 shows example artificial reality system environment 100 including one near-eye display system 120, one imaging device 150, and one input/output interface 140, any number of these components may be included in artificial reality system environment 100, or any of the components may be omitted. For example, there may be multiple near-eye display systems 120 monitored by one or more external imaging devices 150 in communication with console 110. In some configurations, artificial reality system environment 100 may not include imaging device 150, optional input/output interface 140, and optional console 110. In alternative configurations, different or additional components may be included in artificial reality system environment 100. In some configurations, near-eye display systems 120 may include imaging device 150, which may be used to track one or more input/output devices (e.g., input/output interface 140), such as a handhold controller.

Near-eye display system 120 may be a head-mounted display that presents content to a user. Examples of content presented by near-eye display system 120 include one or more of images, videos, audios, or some combination thereof. In some embodiments, audios may be presented via an external device (e.g., speakers and/or headphones) that receives audio information from near-eye display system 120, console 110, or both, and presents audio data based on the audio information. Near-eye display system 120 may include one or more rigid bodies, which may be rigidly or non-rigidly coupled to each other. A rigid coupling between rigid bodies may cause the coupled rigid bodies to act as a single rigid entity. A non-rigid coupling between rigid bodies may allow the rigid bodies to move relative to each other. In various embodiments, near-eye display system 120 may be implemented in any suitable form factor, including a pair of glasses. Some embodiments of near-eye display system 120 are further described below. Additionally, in various embodiments, the functionality described herein may be used in a headset that combines images of an environment external to near-eye display system 120 and artificial reality content (e.g., computer-generated images). Therefore, near-eye display system 120 may augment images of a physical, real-world environment external to near-eye display system 120 with generated content (e.g., images, video, sound, etc.) to present an augmented reality to a user.

In various embodiments, near-eye display system 120 may include one or more of display electronics 122, display optics 124, and an eye-tracking system 130. In some embodiments, near-eye display system 120 may also include one or more locators 126, one or more position sensors 128, and an inertial measurement unit (IMU) 132. Near-eye display system 120 may omit any of these elements or include additional elements in various embodiments. Additionally, in some embodiments, near-eye display system 120 may include elements combining the function of various elements described in conjunction with FIG. 1.

Display electronics 122 may display or facilitate the display of images to the user according to data received from, for example, console 110. In various embodiments, display electronics 122 may include one or more display panels, such as a liquid crystal display (LCD), an organic light emitting diode (OLED) display, an inorganic light emitting diode (ILED) display, a micro light emitting diode (µLED) display, an active-matrix OLED display (AMOLED), a transparent OLED display (TOLED), or some other display. For example, in one implementation of near-eye display system 120, display electronics 122 may include a front TOLED panel, a rear display panel, and an optical component (e.g., an attenuator, polarizer, or diffractive or spectral film) between the front and rear display panels. Display electronics 122 may include pixels to emit light of a predominant color such as red, green, blue, white, or yellow. In some implementations, display electronics 122 may display a three-dimensional (3D) image through stereo effects produced by two-dimensional panels to create a subjective perception of image depth. For example, display electronics 122 may include a left display and a right display positioned in front of a user's left eye and right eye, respectively. The left and right displays may present copies of an image shifted horizontally relative to each other to create a stereoscopic effect (i.e., a perception of image depth by a user viewing the image).

In certain embodiments, display optics 124 may display image content optically (e.g., using optical waveguides and couplers), magnify image light received from display electronics 122, correct optical errors associated with the image light, and present the corrected image light to a user of near-eye display system 120. In various embodiments, display optics 124 may include one or more optical elements, such as, for example, a substrate, optical waveguides, an aperture, a Fresnel lens, a convex lens, a concave lens, a filter, input/output couplers, or any other suitable optical elements that may affect image light emitted from display electronics 122. Display optics 124 may include a combination of different optical elements as well as mechanical couplings to maintain relative spacing and orientation of the optical elements in the combination. One or more optical elements in display optics 124 may have an optical coating, such as an anti-reflective coating, a reflective coating, a filtering coating, or a combination of different optical coatings.

Magnification of the image light by display optics 124 may allow display electronics 122 to be physically smaller, weigh less, and consume less power than larger displays. Additionally, magnification may increase a field of view of the displayed content. The amount of magnification of image light by display optics 124 may be changed by adjusting, adding, or removing optical elements from display optics 124. In some embodiments, display optics 124 may project displayed images to one or more image planes that may be further away from the user's eyes than near-eye display system 120.

Display optics 124 may also be designed to correct one or more types of optical errors, such as two-dimensional optical errors, three-dimensional optical errors, or a combination thereof. Two-dimensional errors may include optical aberrations that occur in two dimensions. Example types of two-dimensional errors may include barrel distortion, pincushion distortion, longitudinal chromatic aberration, and transverse chromatic aberration. Three-dimensional errors may include optical errors that occur in three dimensions. Example types of three-dimensional errors may include spherical aberration, comatic aberration, field curvature, and astigmatism.

Locators 126 may be objects located in specific positions on near-eye display system 120 relative to one another and relative to a reference point on near-eye display system 120. In some implementations, console 110 may identify locators 126 in images captured by imaging device 150 to determine the artificial reality headset's position, orientation, or both. A locator 126 may be a light emitting diode (LED), a corner cube reflector, a reflective marker, a type of light source that contrasts with an environment in which near-eye display system 120 operates, or some combinations thereof. In embodiments where locators 126 are active components (e.g., LEDs or other types of light emitting devices), locators 126 may emit light in the visible band (e.g., about 380 nm to 750 nm), in the infrared (IR) band (e.g., about 750 nm to 1 mm), in the ultraviolet band (e.g., about 10 nm to about 380 nm), in another portion of the electromagnetic spectrum, or in any combination of portions of the electromagnetic spectrum.

Imaging device 150 may be part of near-eye display system 120 or may be external to near-eye display system 120. Imaging device 150 may generate slow calibration data based on calibration parameters received from console 110. Slow calibration data may include one or more images showing observed positions of locators 126 that are detectable by imaging device 150. Imaging device 150 may include one or more cameras, one or more video cameras, any other device capable of capturing images including one or more of locators 126, or some combinations thereof. Additionally, imaging device 150 may include one or more filters (e.g., to increase signal to noise ratio). Imaging device 150 may be configured to detect light emitted or reflected from locators 126 in a field of view of imaging device 150. In embodiments where locators 126 include passive elements (e.g., retroreflectors), imaging device 150 may include a light source that illuminates some or all of locators 126, which may retro-reflect the light to the light source in imaging device 150. Slow calibration data may be communicated from imaging device 150 to console 110, and imaging device 150 may receive one or more calibration parameters from console 110 to adjust one or more imaging parameters (e.g., focal length, focus, frame rate, sensor temperature, shutter speed, aperture, etc.).

Position sensors 128 may generate one or more measurement signals in response to motion of near-eye display system 120. Examples of position sensors 128 may include accelerometers, gyroscopes, magnetometers, other motion-detecting or error-correcting sensors, or some combinations thereof. For example, in some embodiments, position sensors 128 may include multiple accelerometers to measure translational motion (e.g., forward/back, up/down, or left/right) and multiple gyroscopes to measure rotational motion (e.g., pitch, yaw, or roll). In some embodiments, various position sensors may be oriented orthogonally to each other.

IMU 132 may be an electronic device that generates fast calibration data based on measurement signals received from one or more of position sensors 128. Position sensors 128 may be located external to IMU 132, internal to IMU 132, or some combination thereof. Based on the one or more measurement signals from one or more position sensors 128, IMU 132 may generate fast calibration data indicating an estimated position of near-eye display system 120 relative to an initial position of near-eye display system 120. For example, IMU 132 may integrate measurement signals received from accelerometers over time to estimate a velocity vector and integrate the velocity vector over time to determine an estimated position of a reference point on near-eye display system 120. Alternatively, IMU 132 may provide the sampled measurement signals to console 110, which may determine the fast calibration data. While the reference point may generally be defined as a point in space, in various embodiments, the reference point may also be defined as a point within near-eye display system 120 (e.g., a center of IMU 132).

Eye-tracking system 130 may include one or more eye-tracking systems. Eye tracking may refer to determining an eye's position, including orientation and location of the eye, relative to near-eye display system 120. An eye-tracking system may include an imaging system to image one or more eyes and may generally include a light emitter, which may generate light that is directed to an eye such that light reflected by the eye may be captured by the imaging system. For example, eye-tracking system 130 may include a non-coherent or coherent light source (e.g., a laser diode) emitting light in the visible spectrum or infrared spectrum, and a camera capturing the light reflected by the user's eye. As another example, eye-tracking system 130 may capture reflected radio waves emitted by a miniature radar unit. Eye-tracking system 130 may use low-power light emitters that emit light at frequencies and intensities that would not injure the eye or cause physical discomfort. Eye-tracking system 130 may be arranged to increase contrast in images of an eye captured by eye-tracking system 130 while reducing the overall power consumed by eye-tracking system 130 (e.g., reducing power consumed by a light emitter and an imaging system included in eye-tracking system 130). For example, in some implementations, eye-tracking system 130 may consume less than 100 milliwatts of power.

Eye-tracking system 130 may be configured to estimate the orientation of the user's eye. The orientation of the eye may correspond to the direction of the user's gaze within near-eye display system 120. The orientation of the user's eye may be defined as the direction of the foveal axis, which is the axis between the fovea (an area on the retina of the eye with the highest concentration of photoreceptors) and the center of the eye's pupil. In general, when a user's eyes are fixed on a point, the foveal axes of the user's eyes intersect that point. The pupillary axis of an eye may be defined as the axis that passes through the center of the pupil and is perpendicular to the corneal surface. In general, even though the pupillary axis and the foveal axis intersect at the center of the pupil, the pupillary axis may not directly align with the foveal axis. For example, the orientation of the foveal axis may be offset from the pupillary axis by approximately −1° to 8° laterally and about 4° vertically (which may be referred to as kappa angles, which may vary from person to person). Because the foveal axis is defined according to the fovea, which is located in the back of the eye, the foveal axis may be difficult or impossible to measure directly in some eye-tracking embodiments. Accordingly, in some embodiments, the orientation of the pupillary axis may be detected and the foveal axis may be estimated based on the detected pupillary axis.

In general, the movement of an eye corresponds not only to an angular rotation of the eye, but also to a translation of the eye, a change in the torsion of the eye, and/or a change in the shape of the eye. Eye-tracking system 130 may also be configured to detect the translation of the eye, which may be a change in the position of the eye relative to the eye socket. In some embodiments, the translation of the eye may not be detected directly, but may be approximated based on a mapping from a detected angular orientation. Translation of the eye corresponding to a change in the eye's position relative to the eye-tracking system due to, for example, a shift in the position of near-eye display system 120 on a user's head, may also be detected. Eye-tracking system 130 may also detect the torsion of the eye and the rotation of the eye about the pupillary axis. Eye-tracking system 130 may use the detected torsion of the eye to estimate the orientation of the foveal axis from the pupillary axis. In some embodiments, eye-tracking system 130 may also track a change in the shape of the eye, which may be approximated as a skew or scaling linear transform or a twisting distortion (e.g., due to torsional deformation). In some embodiments, eye-tracking system 130 may estimate the foveal axis based on some combinations of the angular orientation of the pupillary axis, the translation of the eye, the torsion of the eye, and the current shape of the eye.

In some embodiments, eye-tracking system 130 may include multiple emitters or at least one emitter that can project a structured light pattern on all portions or a portion of the eye. The structured light pattern may be distorted due to the shape of the eye when viewed from an offset angle. Eye-tracking system 130 may also include at least one camera that may detect the distortions (if any) of the structured light pattern projected onto the eye. The camera may be oriented on a different axis to the eye than the emitter. By detecting the deformation of the structured light pattern on the surface of the eye, eye-tracking system 130 may determine the shape of the portion of the eye being illuminated by the structured light pattern. Therefore, the captured distorted light pattern may be indicative of the 3D shape of the illuminated portion of the eye. The orientation of the eye may thus be derived from the 3D shape of the illuminated portion of the eye. Eye-tracking system 130 can also estimate the pupillary axis, the translation of the eye, the torsion of the eye, and the current shape of the eye based on the image of the distorted structured light pattern captured by the camera.

Near-eye display system 120 may use the orientation of the eye to, e.g., determine an inter-pupillary distance (IPD) of the user, determine gaze directions, introduce depth cues (e.g., blur image outside of the user's main line of sight), collect heuristics on the user interaction in the VR media (e.g., time spent on any particular subject, object, or frame as a function of exposed stimuli), some other functions that are based in part on the orientation of at least one of the user's eyes, or some combination thereof. Because the orientation may be determined for both eyes of the user, eye-tracking system 130 may be able to determine where the user is looking. For example, determining a direction of a user's gaze may include determining a point of convergence based on the determined orientations of the user's left and right eyes. A point of convergence may be the point where the two foveal axes of the user's eyes intersect. The direction of the user's gaze may be the direction of a line passing through the point of convergence and the mid-point between the pupils of the user's eyes.

Input/output interface 140 may be a device that allows a user to send action requests to console 110. An action request may be a request to perform a particular action. For example, an action request may be to start or to end an application or to perform a particular action within the application. Input/output interface 140 may include one or more input devices. Example input devices may include a keyboard, a mouse, a game controller, a glove, a button, a touch screen, or any other suitable device for receiving action requests and communicating the received action requests to console 110. An action request received by the input/output interface 140 may be communicated to console 110, which may perform an action corresponding to the requested action. In some embodiments, input/output interface 140 may provide haptic feedback to the user in accordance with instructions received from console 110. For example, input/output interface 140 may provide haptic feedback when an action request is received, or when console 110 has performed a requested action and communicates instructions to input/output interface 140. In some embodiments, imaging device 150 may be used to track input/output interface 140, such as tracking the location or position of a controller (which may include, for example, an IR light source) or a hand of the user to determine the motion of the user. In some embodiments, near-eye display system 120 may include one or more imaging devices (e.g., imaging device 150) to track input/output interface 140, such as tracking the location or position of a controller or a hand of the user to determine the motion of the user.

Console 110 may provide content to near-eye display system 120 for presentation to the user in accordance with information received from one or more of imaging device 150, near-eye display system 120, and input/output interface 140. In the example shown in FIG. 1, console 110 may include an application store 112, a headset tracking module 114, an artificial reality engine 116, and eye-tracking module 118. Some embodiments of console 110 may include different or additional modules than those described in conjunction with FIG. 1. Functions further described below may be distributed among components of console 110 in a different manner than is described here.

In some embodiments, console 110 may include a processor and a non-transitory computer-readable storage medium storing instructions executable by the processor. The processor may include multiple processing units executing instructions in parallel. The computer-readable storage medium may be any memory, such as a hard disk drive, a removable memory, or a solid-state drive (e.g., flash memory or dynamic random access memory (DRAM)). In various embodiments, the modules of console 110 described in conjunction with FIG. 1 may be encoded as instructions in the non-transitory computer-readable storage medium that, when executed by the processor, cause the processor to perform the functions further described below.

Application store 112 may store one or more applications for execution by console 110. An application may include a group of instructions that, when executed by a processor, generates content for presentation to the user. Content generated by an application may be in response to inputs received from the user via movement of the user's eyes or inputs received from the input/output interface 140. Examples of the applications may include gaming applications, conferencing applications, video playback application, or other suitable applications.

Headset tracking module 114 may track movements of near-eye display system 120 using slow calibration information from imaging device 150. For example, headset tracking module 114 may determine positions of a reference point of near-eye display system 120 using observed locators from the slow calibration information and a model of near-eye display system 120. Headset tracking module 114 may also determine positions of a reference point of near-eye display system 120 using position information from the fast calibration information. Additionally, in some embodiments, headset tracking module 114 may use portions of the fast calibration information, the slow calibration information, or some combination thereof, to predict a future location of near-eye display system 120. Headset tracking module 114 may provide the estimated or predicted future position of near-eye display system 120 to artificial reality engine 116.

Headset tracking module 114 may calibrate the artificial reality system environment 100 using one or more calibration parameters, and may adjust one or more calibration parameters to reduce errors in determining the position of near-eye display system 120. For example, headset tracking module 114 may adjust the focus of imaging device 150 to obtain a more accurate position for observed locators on near-eye display system 120. Moreover, calibration performed by headset tracking module 114 may also account for information received from IMU 132. Additionally, if tracking of near-eye display system 120 is lost (e.g., imaging device 150 loses line of sight of at least a threshold number of locators 126), headset tracking module 114 may re-calibrate some or all of the calibration parameters.

Artificial reality engine 116 may execute applications within artificial reality system environment 100 and receive position information of near-eye display system 120, acceleration information of near-eye display system 120, velocity information of near-eye display system 120, predicted future positions of near-eye display system 120, or some combination thereof from headset tracking module 114. Artificial reality engine 116 may also receive estimated eye position and orientation information from eye-tracking module 118. Based on the received information, artificial reality engine 116 may determine content to provide to near-eye display system 120 for presentation to the user. For example, if the received information indicates that the user has looked to the left, artificial reality engine 116 may generate content for near-eye display system 120 that reflects the user's eye movement in a virtual environment. Additionally, artificial reality engine 116 may perform an action within an application executing on console 110 in response to an action request received from input/output interface 140, and provide feedback to the user indicating that the action has been performed. The feedback may be visual or audible feedback via near-eye display system 120 or haptic feedback via input/output interface 140.

Eye-tracking module 118 may receive eye-tracking data from eye-tracking system 130 and determine the position of the user's eye based on the eye-tracking data. The position of the eye may include an eye's orientation, location, or both relative to near-eye display system 120 or any element thereof. Because the eye's axes of rotation change as a function of the eye's location in its socket, determining the eye's location in its socket may allow eye-tracking module 118 to more accurately determine the eye's orientation.

In some embodiments, eye-tracking module 118 may store a mapping between images captured by eye-tracking system 130 and eye positions to determine a reference eye position from an image captured by eye-tracking system 130. Alternatively or additionally, eye-tracking module 118 may determine an updated eye position relative to a reference eye position by comparing an image from which the reference eye position is determined to an image from which the updated eye position is to be determined. Eye-tracking module 118 may determine eye position using measurements from different imaging devices or other sensors. For example, eye-tracking module 118 may use measurements from a slow eye-tracking system to determine a reference eye position, and then determine updated positions relative to the reference eye position from a fast eye-tracking system until a next reference eye position is determined based on measurements from the slow eye-tracking system.

Eye-tracking module 118 may also determine eye calibration parameters to improve precision and accuracy of eye tracking. Eye calibration parameters may include parameters that may change whenever a user dons or adjusts near-eye display system 120. Example eye calibration parameters may include an estimated distance between a component of eye-tracking system 130 and one or more parts of the eye, such as the eye's center, pupil, cornea boundary, or a point on the surface of the eye. Other example eye calibration parameters may be specific to a particular user and may include an estimated average eye radius, an average corneal radius, an average sclera radius, a map of features on the eye surface, and an estimated eye surface contour. In embodiments where light from the outside of near-eye display system 120 may reach the eye (as in some augmented reality applications), the calibration parameters may include correction factors for intensity and color balance due to variations in light from the outside of near-eye display system 120. Eye-tracking module 118 may use eye calibration parameters to determine whether the measurements captured by eye-tracking system 130 would allow eye-tracking module 118 to determine an accurate eye position (also referred to herein as "valid measurements"). Invalid measurements, from which eye-tracking module 118 may not be able to determine an accurate eye position, may be caused by the user blinking, adjusting the headset, or removing the headset, and/or may be caused by near-eye display system 120 experiencing greater than a threshold change in illumination due to external light. In some embodiments, at least some of the functions of eye-tracking module 118 may be performed by eye-tracking system 130.

Figure 2:
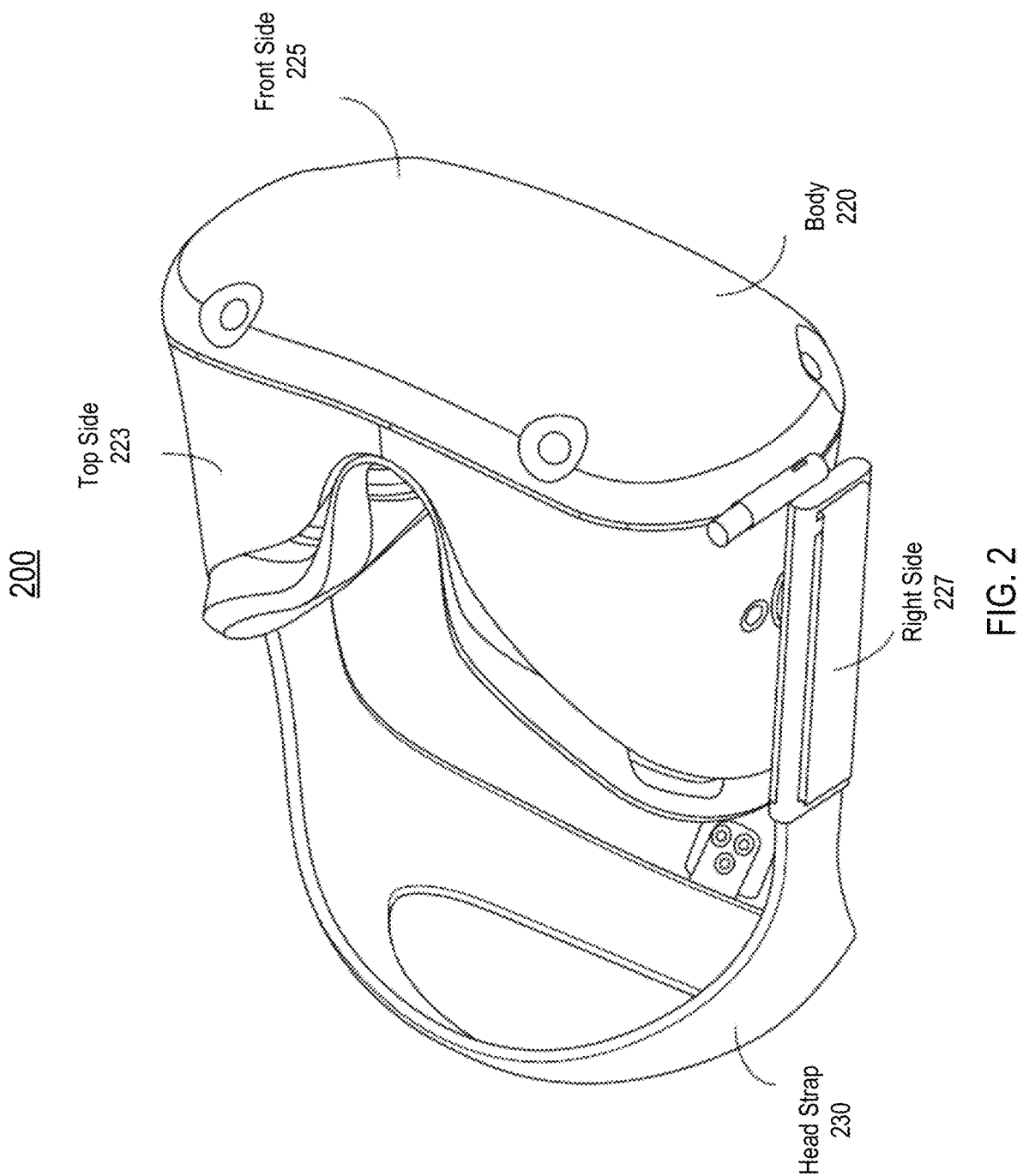
FIG. 2 is a perspective view of an example of a near-eye display in the form of a head-mounted display (HMD) device for implementing some of the examples disclosed herein.

FIG. 2 is a perspective view of an example of a near-eye display in the form of a head-mounted display (HMD) device 200 for implementing some of the examples disclosed herein. HMD device 200 may be a part of, e.g., a virtual reality (VR) system, an augmented reality (AR) system, a mixed reality (MR) system, or some combinations thereof. HMD device 200 may include a body 220 and a head strap 230. FIG. 2 shows a top side 223, a front side 225, and a right side 227 of body 220 in the perspective view. Head strap 230 may have an adjustable or extendible length. There may be a sufficient space between body 220 and head strap 230 of HMD device 200 for allowing a user to mount HMD device 200 onto the user's head. In various embodiments, HMD device 200 may include additional, fewer, or different components. For example, in some embodiments, HMD device 200 may include eyeglass temples and temples tips as shown in, for example, FIG. 2, rather than head strap 230.

HMD device 200 may present to a user media including virtual and/or augmented views of a physical, real-world environment with computer-generated elements. Examples of the media presented by HMD device 200 may include images (e.g., two-dimensional (2D) or three-dimensional (3D) images), videos (e.g., 2D or 3D videos), audios, or some combinations thereof. The images and videos may be presented to each eye of the user by one or more display assemblies (not shown in FIG. 2) enclosed in body 220 of HMD device 200. In various embodiments, the one or more display assemblies may include a single electronic display panel or multiple electronic display panels (e.g., one display panel for each eye of the user). Examples of the electronic display panel(s) may include, for example, a liquid crystal display (LCD), an organic light emitting diode (OLED) display, an inorganic light emitting diode (ILED) display, a micro light emitting diode (mLED) display, an active-matrix organic light emitting diode (AMOLED) display, a transparent organic light emitting diode (TOLED) display, some other display, or some combinations thereof. HMD device 200 may include two eye box regions.

In some implementations, HMD device 200 may include various sensors (not shown), such as depth sensors, motion sensors, position sensors, and eye tracking sensors. Some of these sensors may use a structured light pattern for sensing. In some implementations, HMD device 200 may include an input/output interface for communicating with a console. In some implementations, HMD device 200 may include a virtual reality engine (not shown) that can execute applications within HMD device 200 and receive depth information, position information, acceleration information, velocity information, predicted future positions, or some combination thereof of HMD device 200 from the various sensors. In some implementations, the information received by the virtual reality engine may be used for producing a signal (e.g., display instructions) to the one or more display assemblies. In some implementations, HMID device 200 may include locators (not shown, such as locators 126) located in fixed positions on body 220 relative to one another and relative to a reference point. Each of the locators may emit light that is detectable by an external imaging device.

Figure 3:
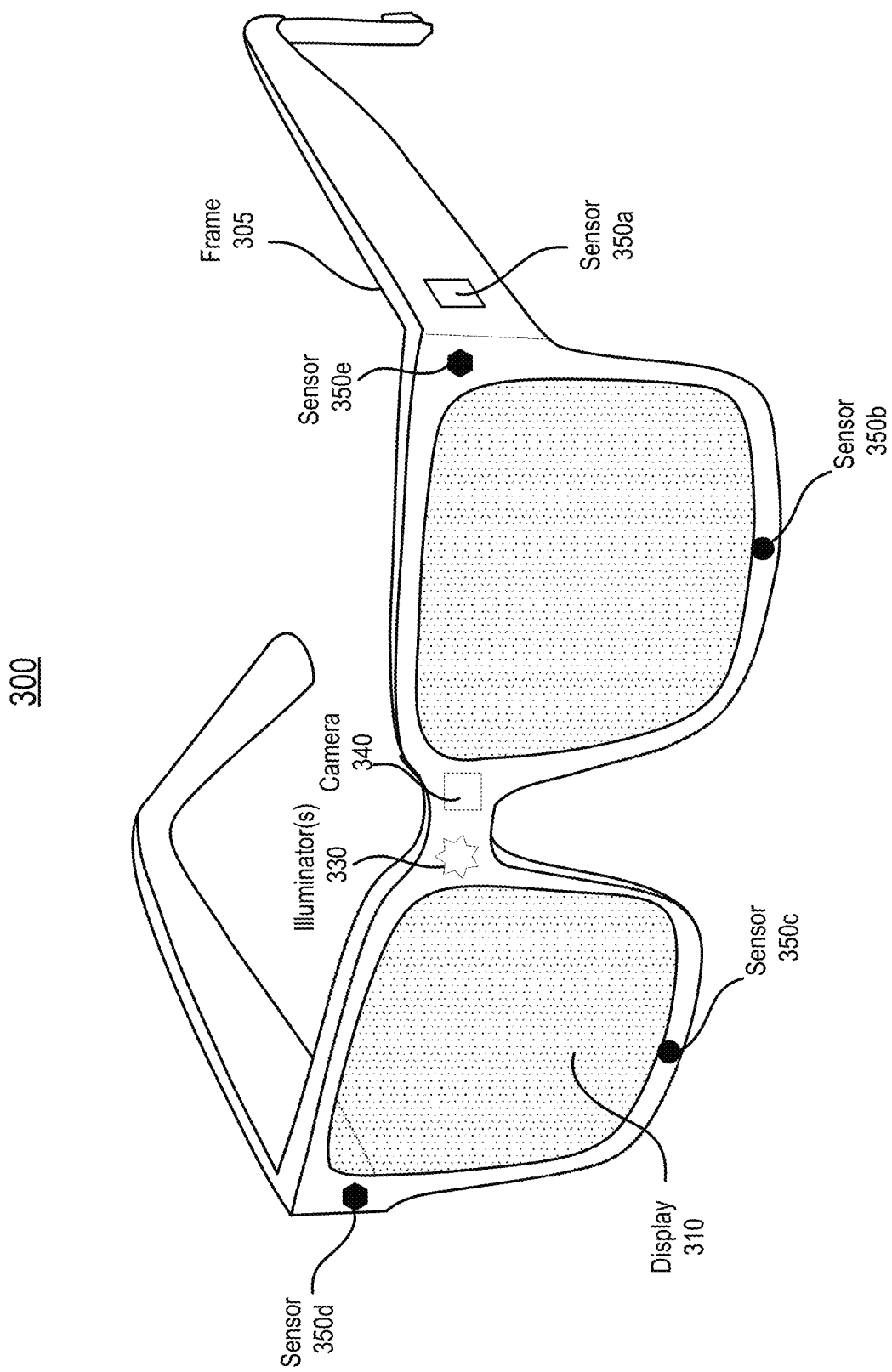
FIG. 3 is a perspective view of a simplified example of a near-eye display in the form of a pair of glasses for implementing some of the examples disclosed herein.

FIG. 3 is a perspective view of an example of a near-eye display 300 in the form of a pair of glasses for implementing some of the examples disclosed herein. Near-eye display 300 may be a specific implementation of near-eye display system 120 of FIG. 1, and may be configured to operate as a virtual reality display, an augmented reality display, and/or a mixed reality display. Near-eye display 300 may include a frame 305 and a display 310. Display 310 may be configured to present content to a user. In some embodiments, display 310 may include display electronics and/or display optics. For example, as described above with respect to near-eye display system 120 of FIG. 1, display 310 may include an LCD display panel, an LED display panel, or an optical display panel (e.g., a waveguide display assembly).

Near-eye display 300 may further include various sensors 350*a*, 350*b*, 350*c*, 350*d*, and 350*e* on or within frame 305. In some embodiments, sensors 350*a*-350*e* may include one or more depth sensors, motion sensors, position sensors, inertial sensors, or ambient light sensors. In some embodiments, sensors 350*a*-350*e* may include one or more image sensors configured to generate image data representing different fields of views in different directions. In some embodiments, sensors 350*a*-350*e* may be used as input devices to control or influence the displayed content of near-eye display 300, and/or to provide an interactive VR/AR/MR experience to a user of near-eye display 300. In some embodiments, sensors 350*a*-350*e* may also be used for stereoscopic imaging.

In some embodiments, near-eye display 300 may further include one or more illuminators 330 to project light into the physical environment. The projected light may be associated with different frequency bands (e.g., visible light, infra-red light, ultra-violet light, etc.), and may serve various purposes. For example, illuminator(s) 330 may project light in a dark environment (or in an environment with low intensity of infra-red light, ultra-violet light, etc.) to assist sensors 350*a*-350*e* in capturing images of different objects within the dark environment. In some embodiments, illuminator(s) 330 may be used to project certain light pattern onto the objects within the environment. In some embodiments, illuminator(s) 330 may be used as locators, such as locators 126 described above with respect to FIG. 1.

In some embodiments, near-eye display 300 may also include a high-resolution camera 340. Camera 340 may capture images of the physical environment in the field of view. The captured images may be processed, for example, by a virtual reality engine (e.g., artificial reality engine 116 of FIG. 1) to add virtual objects to the captured images or modify physical objects in the captured images, and the processed images may be displayed to the user by display 310 for AR or MR applications.

Figure 4:
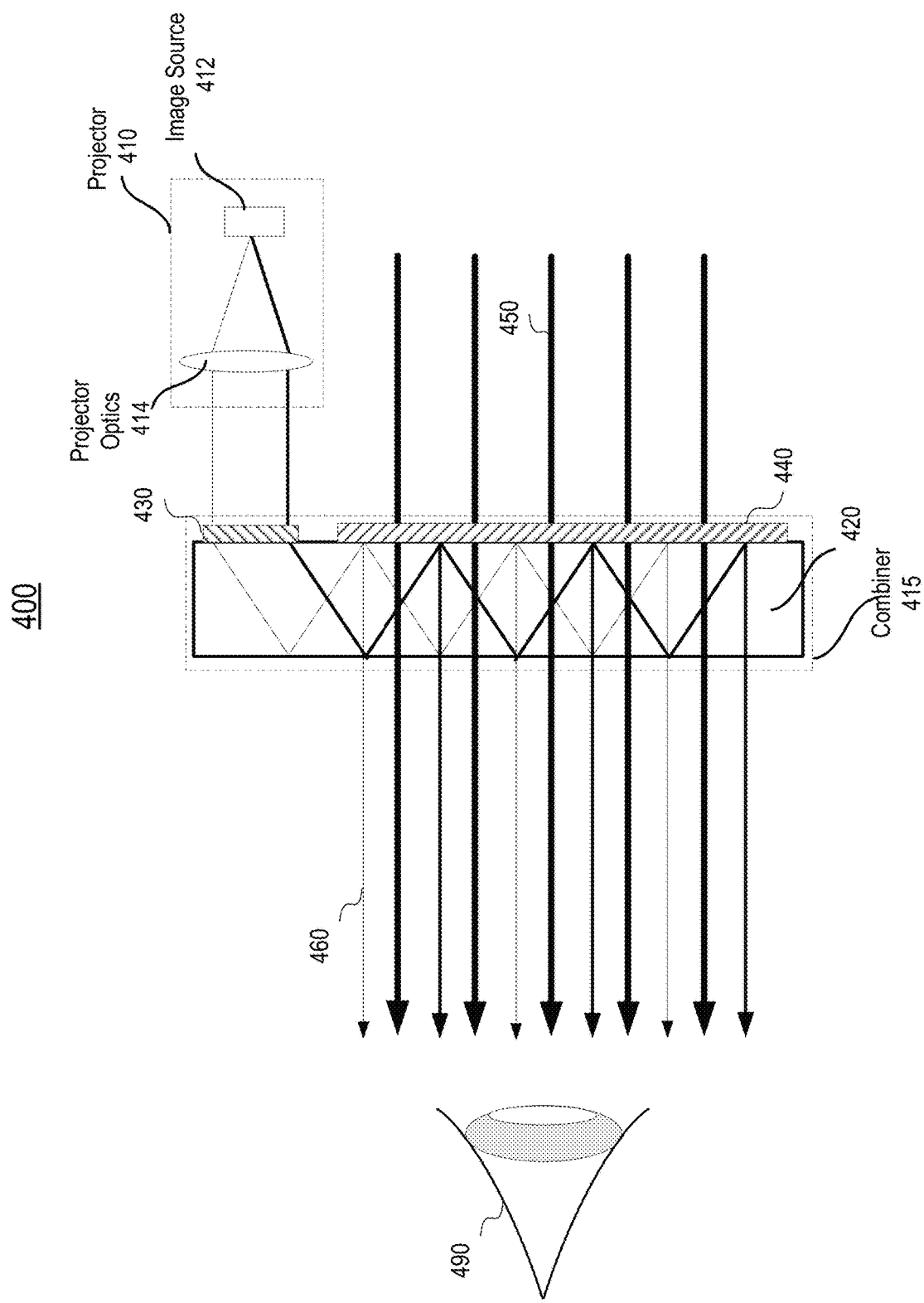
FIG. 4 illustrates an example of an optical see-through augmented reality system using a waveguide display according to certain embodiments.

FIG. 4 illustrates an example of an optical see-through augmented reality system 400 using a waveguide display according to certain embodiments. Augmented reality system 400 may include a projector 410 and a combiner 415. Projector 410 may include a light source or image source 412 and projector optics 414. In some embodiments, image source 412 may include a plurality of pixels that displays virtual objects, such as an LCD display panel or an LED display panel. In some embodiments, image source 412 may include a light source that generates coherent or partially coherent light. For example, image source 412 may include a laser diode, a vertical cavity surface emitting laser, and/or a light emitting diode. In some embodiments, image source 412 may include a plurality of light sources each emitting a monochromatic image light corresponding to a primary color (e.g., red, green, or blue). In some embodiments, image source 412 may include an optical pattern generator, such as a spatial light modulator. Projector optics 414 may include one or more optical components that can condition the light from image source 412, such as expanding, collimating, scanning, or projecting light from image source 412 to combiner 415. The one or more optical components may include, for example, one or more lenses, liquid lenses, mirrors, apertures, and/or gratings. In some embodiments, projector optics 414 may include a liquid lens (e.g., a liquid crystal lens) with a plurality of electrodes that allows scanning of the light from image source 412.

Combiner 415 may include an input coupler 430 for coupling light from projector 410 into a substrate 420 of combiner 415. Input coupler 430 may include a volume holographic grating, a diffractive optical elements (DOE) (e.g., a surface-relief grating), or a refractive coupler (e.g., a wedge or a prism). Input coupler 430 may have a coupling efficiency of greater than 30%, 50%, 75%, 90%, or higher for visible light. As used herein, visible light may refer to light with a wavelength between about 380 nm to about 750 nm. Light coupled into substrate 420 may propagate within substrate 420 through, for example, total internal reflection (TIR). Substrate 420 may be in the form of a lens of a pair of eyeglasses. Substrate 420 may have a flat or a curved surface, and may include one or more types of dielectric materials, such as glass, quartz, plastic, polymer, poly(methyl methacrylate) (PMMA), crystal, or ceramic. A thickness of the substrate may range from, for example, less than about 1 mm to about 10 mm or more. Substrate 420 may be transparent to visible light. A material may be "transparent" to a light beam if the light beam can pass through the material with a high transmission rate, such as larger than 50%, 40%, 75%, 80%, 90%, 95%, or higher, where a small portion of the light beam (e.g., less than 50%, 40%, 25%, 20%, 10%, 5%, or less) may be scattered, reflected, or absorbed by the material. The transmission rate (i.e., transmissivity) may be represented by either a photopically weighted or an unweighted average transmission rate over a range of wavelengths, or the lowest transmission rate over a range of wavelengths, such as the visible wavelength range.

Substrate 420 may include or may be coupled to a plurality of output couplers 440 configured to extract at least a portion of the light guided by and propagating within substrate 420 from substrate 420, and direct extracted light 460 to an eye 490 of the user of augmented reality system 400. As input coupler 430, output couplers 440 may include grating couplers (e.g., volume holographic gratings or surface-relief gratings), other DOEs, prisms, etc. Output couplers 440 may have different coupling (e.g., diffraction) efficiencies at different locations. Substrate 420 may also allow light 450 from environment in front of combiner 415 to pass through with little or no loss. Output couplers 440 may also allow light 450 to pass through with little loss. For example, in some implementations, output couplers 440 may have a low diffraction efficiency for light 450 such that light 450 may be refracted or otherwise pass through output couplers 440 with little loss, and thus may have a higher intensity than extracted light 460. In some implementations, output couplers 440 may have a high diffraction efficiency for light 450 and may diffract light 450 to certain desired directions (i.e., diffraction angles) with little loss. As a result, the user may be able to view combined images of the environment in front of combiner 415 and virtual objects projected by projector 410.

Figure 5:
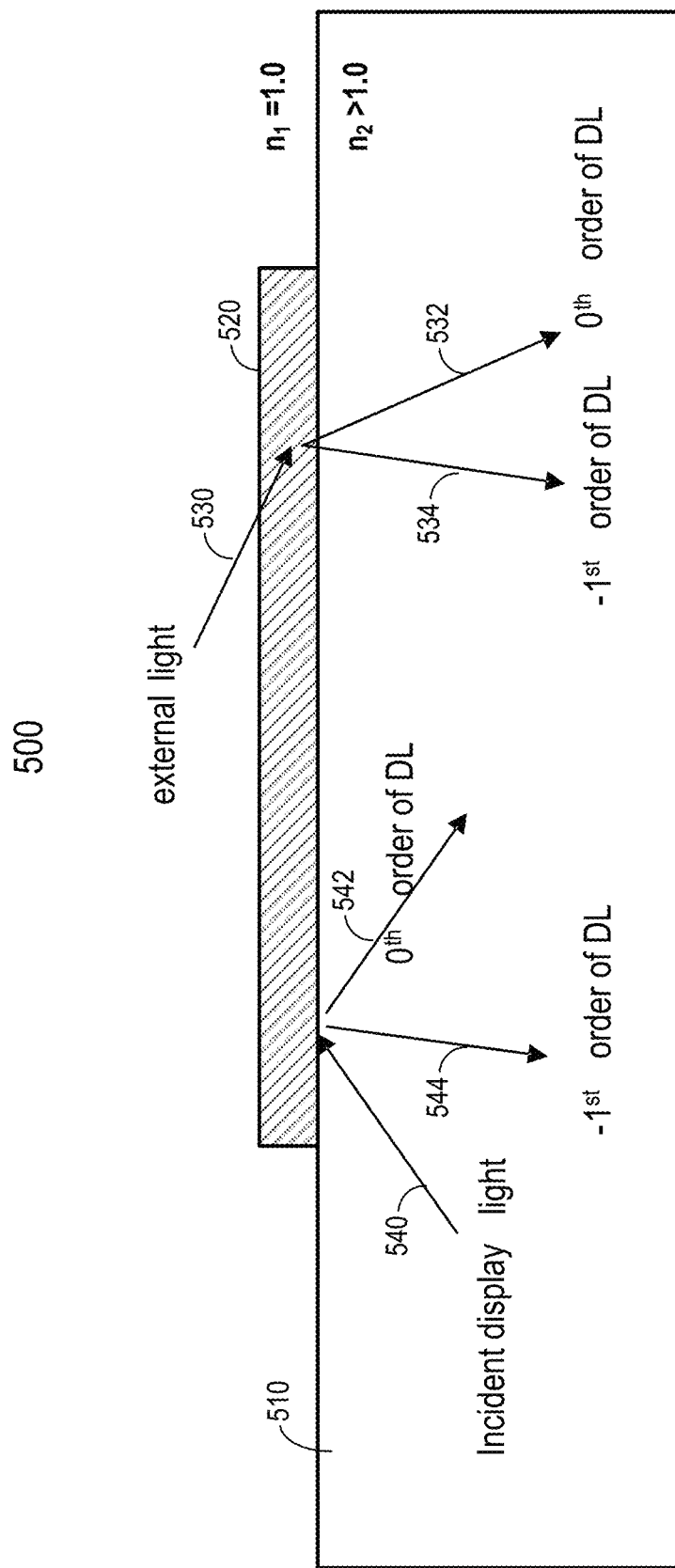
FIG. 5 illustrates propagations of display light and external light in an example of a waveguide display.

FIG. 5 illustrates propagations of incident display light 540 and external light 530 in an example of a waveguide display 500 including a waveguide 510 and a grating coupler 520. Waveguide display 500 may include, for example, combiner 415 of FIG. 4. Waveguide 510 may be a flat or curved transparent substrate with a refractive index $n_2$ greater than the free space refractive index $n_1$ (i.e., 1.0). Grating coupler 520 may include, for example, a Bragg grating or a surface-relief grating.

Incident display light 540 may be coupled into waveguide 510 by, for example, input coupler 430 of FIG. 4 or other couplers (e.g., a prism or slanted surface) described above. Incident display light 540 may propagate within waveguide 510 through, for example, total internal reflection. When incident display light 540 reaches grating coupler 520, incident display light 540 may be diffracted by grating coupler 520 into, for example, a $0^{th}$ order diffraction (i.e., reflection) light 542 and a −1st order diffraction light 544. The $0^{th}$ order diffraction may continue to propagate within waveguide 510, and may be reflected by the bottom surface of waveguide 510 towards grating coupler 520 at a different location. The −1st order diffraction light 544 may be coupled (e.g., refracted) out of waveguide 510 towards the user's eye, because a total internal reflection condition may not be met at the bottom surface of waveguide 510 due to the diffraction angle of the $-1^{st}$ order diffraction light 544.

External light 530 may also be diffracted by grating coupler 520 into, for example, a $0^{th}$ order diffraction light 532 or a −1st order diffraction light 534. The $0^{th}$ order diffraction light 532 or the −1st order diffraction light 534 may be refracted out of waveguide 510 towards the user's eye. Thus, grating coupler 520 may act as an input coupler for coupling external light 530 into waveguide 510, and may also act as an output coupler for coupling incident display light 540 out of waveguide 510. As such, grating coupler 520 may act as a combiner for combining external light 530 and incident display light 540 and send the combined light to the user's eye.

In order to diffract light at a desired direction towards the user's eye and to achieve a desired diffraction efficiency for certain diffraction orders, grating coupler 520 may include a blazed or slanted grating, such as a slanted Bragg grating or surface-relief grating, where the grating ridges and grooves may be tilted relative to the surface normal of grating coupler 520 or waveguide 510.

Figure 6:
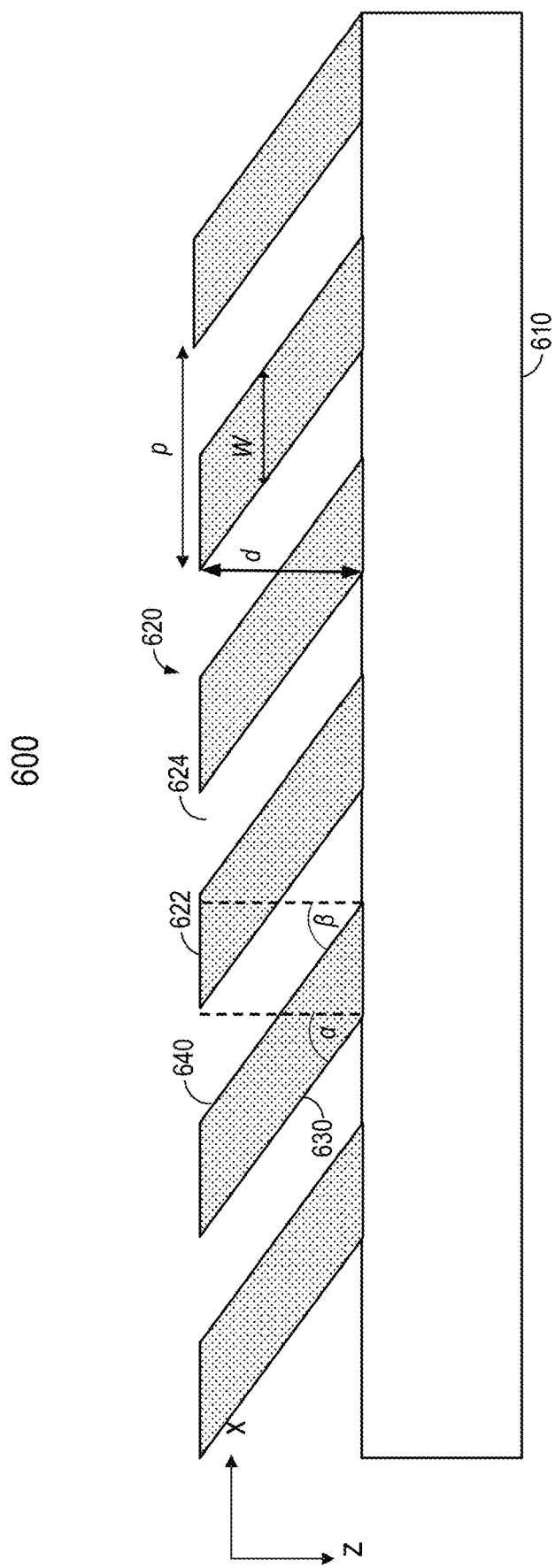
FIG. 6 illustrates an example of a slanted grating coupler in a waveguide display according to certain embodiments.

FIG. 6 illustrates an example of a slanted grating 620 in a waveguide display 600 according to certain embodiments. Slanted grating 620 may be an example of output couplers 440 or grating coupler 520. Waveguide display 600 may include slanted grating 620 on a waveguide 610, such as substrate 420 or waveguide 510. Slanted grating 620 may act as a grating coupler for couple light into or out of waveguide 610. In some embodiments, slanted grating 620 may include a periodic structure with a period p. For example, slanted grating 620 may include a plurality of ridges 622 and grooves 624 between ridges 622. Each period of slanted grating 620 may include a ridge 622 and a groove 624, which may be an air gap or a region filled with a material with a refractive index $n_{g2}$. The ratio between the width d of a ridge 622 and the grating period p may be referred to as duty cycle. Slanted grating 620 may have a duty cycle ranging, for example, from about 10% to about 90% or greater. In some embodiments, the duty cycle may vary from period to period. In some embodiments, the period p of the slanted grating may vary from one area to another on slanted grating 620, or may vary from one period to another (i.e., chirped) on slanted grating 620.

Ridges 622 may be made of a material with a refractive index of $n_{g1}$, such as silicon containing materials (e.g., $SiO_2$, $Si_3N_4$, SiC, $SiO_xN_y$, or amorphous silicon), organic materials (e.g., spin on carbon (SOC) or amorphous carbon layer (ACL) or diamond like carbon (DLC)), or inorganic metal oxide layers (e.g., $TiO_x$, $AlO_x$, $TaO_x$, $HfO_x$, etc.). Each ridge 622 may include a leading edge 630 with a slant angel α and a trailing edge 640 with a slant angle β. In some embodiments, leading edge 630 and training edge 640 of each ridge 622 may be parallel to each other. In other words, slant angle α is approximately equal to slant angle β. In some embodiments, slant angle α may be different from slant angle β. In some embodiments, slant angle α may be approximately equal to slant angle β. For example, the difference between slant angle α and slant angle β may be less than 20%, 10%, 5%, 1%, or less. In some embodiments, slant angle α and slant angle β may range from, for example, about 30° or less to about 70% or larger.

In some implementations, grooves 624 between the ridges 622 may be over-coated or filled with a material having a refractive index $n_{g2}$ higher or lower than the refractive index of the material of ridges 622. For example, in some embodiments, a high refractive index material, such as Hafnia, Titania, Tantalum oxide, Tungsten oxide, Zirconium oxide, Gallium sulfide, Gallium nitride, Gallium phosphide, silicon, and a high refractive index polymer, may be used to fill grooves 624. In some embodiments, a low refractive index material, such as silicon oxide, alumina, porous silica, or fluorinated low index monomer (or polymer), may be used to fill grooves 624. As a result, the difference between the refractive index of the ridges and the refractive index of the grooves may be greater than 0.1, 0.2, 0.3, 0.5, 1.0, or higher.

The user experience with an artificial reality system may depend on several optical characteristics of the artificial reality system, such as the field of view (FOV), image quality (e.g., resolution), size of the eye box of the system (to accommodate for eye and/or head movement), the distance of eye relief, optical bandwidth, and brightness of the displayed image. In general, the FOV and the eye box need to be as large as possible, the optical bandwidth needs to cover the visible band, and the brightness of the displayed image needs to be high enough (especially for optical see-through AR systems).

In a waveguide-based near-eye display, the output area of the display is usually much larger than the size of the eyebox of the near-eye display system. The portion of light that may reach a user's eyes may depend on the ratio between the size of the eyebox and the output area of the display, which, in some cases, may be less than 10% for a certain eye relief and field of view. In order to achieve a desired brightness of the displayed image perceived by user's eyes, the display light from the projector or the light source may need to be increased significantly, which may increase the power consumption and cause some safety concerns.

Figure 7B:
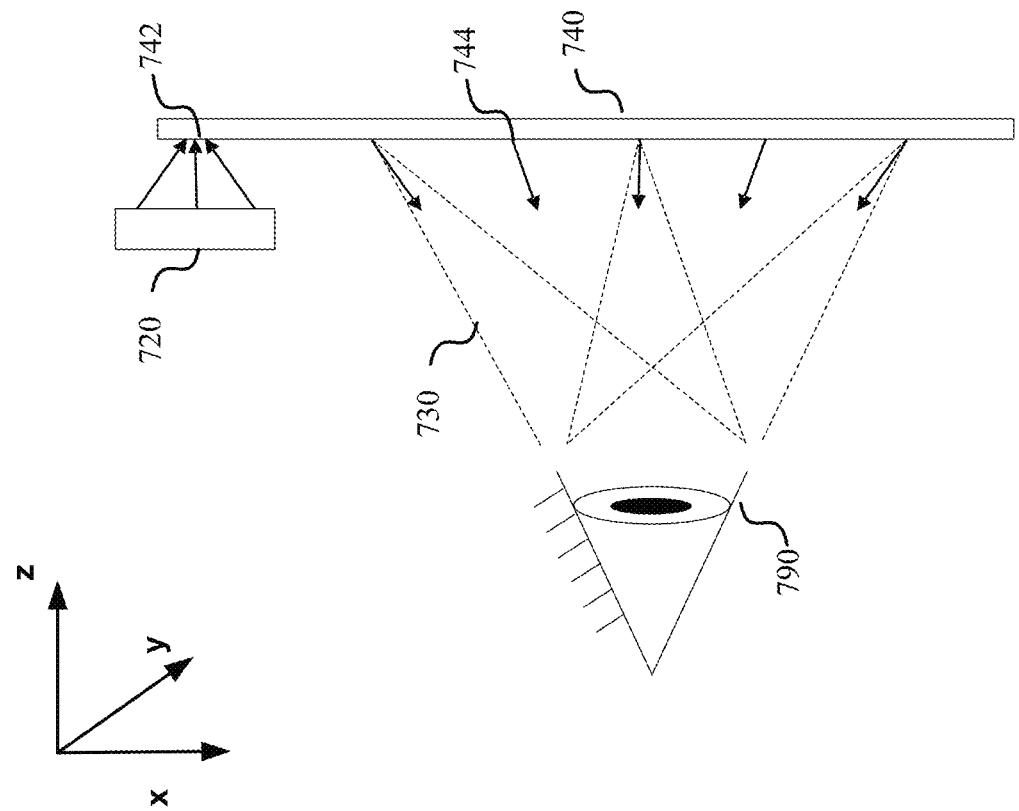
FIG. 7B illustrates an example of a waveguide-based near-eye display where display light may be coupled out of a waveguide display at different angles in different regions of the waveguide according to certain embodiments.
Figure 7A:
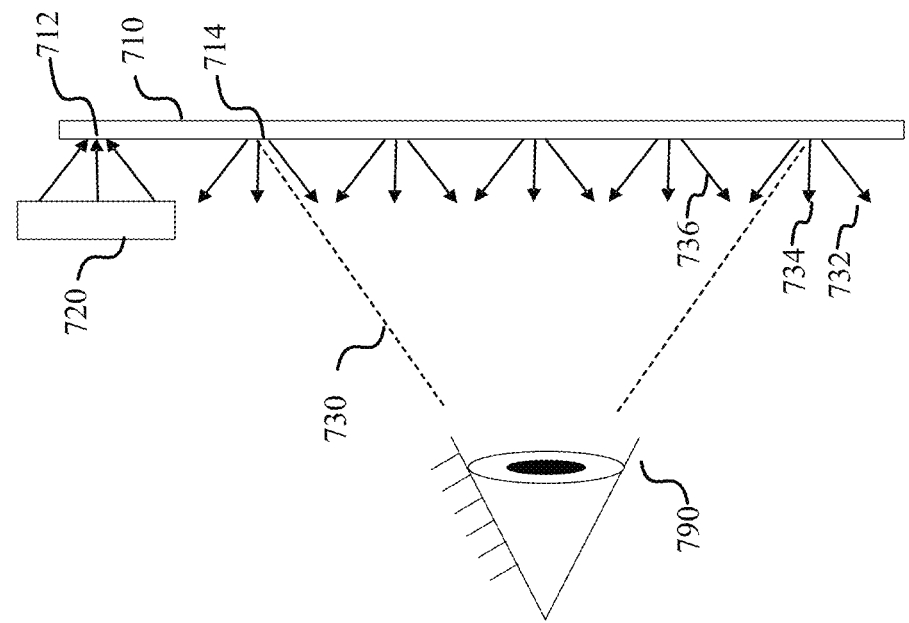
FIG. 7A illustrates an example of a waveguide-based near-eye display where display light for all fields of view is uniformly output from different regions of a waveguide display.

FIG. 7A illustrates an example of a waveguide-based near-eye display where display light for all fields of view is uniformly output from different regions of a waveguide display 710. The near-eye display may include a projector 720 and waveguide display 710. Projector 720 may be similar to projector 410 and may include a light source or image source similar to light source or image source 412 and projector optics similar to projector optics 414. Waveguide display 710 may include a waveguide (e.g., a substrate), one or more input couplers 712, and one or more output couplers 714. Input couplers 712 may be configured to couple display light from different fields of view (or viewing angles) into the waveguide, and output couplers 714 may be configured to couple display light out of the waveguide. The input and output couplers may include, for example, slanted surface-relief gratings or volume Bragg gratings. In the example shown in FIG. 7, output coupler 714 may have similar grating parameters across the full region of the output coupler other than parameters that may be varied to adjust the coupling efficiency for more uniform output light. Thus, the display light may be partially coupled out of the waveguide at different regions of waveguide display 710 in a similar manner as shown in FIG. 7A, where display light from all fields of view of the near-eye display may be partially coupled out of the waveguide at any given region of waveguide display 710.

As also shown in FIG. 7A, the near-eye display system may have an eyebox at a certain eyebox position 790 and having a limited size and thus a limited field of view 730. As such, not all light coupled out of the waveguide in waveguide display 710 may reach the eyebox at eyebox position 790. For example, display light 732, 734, and 736 from waveguide display 710 may not reach the eyebox at eyebox position 790, and thus may not be received by the user's eyes, which may result in significant loss of the optical power from projector 720.

In certain embodiments, an optical coupler (e.g., a slanted surface-relief grating) for a waveguide-based display may include a grating coupler that includes multiple regions (or multiple multiplexed grating), where different regions of the grating coupler may have different angular selectivity characteristics (e.g., constructive interference conditions) for the incident display light such that, at any region of the waveguide-based display, diffraction light that would not eventually reach user's eyes may be suppressed (i.e., may not be diffracted by the grating coupler so as to be coupled into or out of the waveguide and thus may continue to propagate within the waveguide), while light that may eventually reach the user's eyes may be diffracted by the grating coupler and be coupled into or out of the waveguide.

FIG. 7B illustrates an example of a waveguide-based near-eye display where display light may be coupled out of a waveguide display 740 at different angles in different regions of the waveguide according to certain embodiments. Waveguide display 740 may include a waveguide (e.g., a substrate), one or more input couplers 742, and one or more output couplers 744. Input couplers 742 may be configured to couple display light from different fields of view (e.g., viewing angles) into the waveguide, and output couplers 744 may be configured to couple display light out of the waveguide. The input and output couplers may include, for example, slanted surface-relief gratings or other gratings. The output couplers may have different grating parameters and thus different angular selectivity characteristics at different regions of the output couplers. Thus, at each region of the output coupler, only display light that would propagate in a certain angular range towards the eyebox at eyebox position 790 of the near-eye display may be coupled out of the waveguide, while other display light may not meet the angular selectivity condition at the region and thus may not be coupled out of the substrate. In some embodiments, the input couplers may also have different grating parameters and thus different angular selectivity characteristics at different regions of the input couplers, and thus, at each region of an input coupler, only display light from a respective field of view may be coupled into the waveguide. As a result, most of the display light coupled into the waveguide and propagating in the waveguide can be efficiently sent to the eyebox, thus improving the power efficiency of the waveguide-based near-eye display system.

The refractive index modulation of a slanted surface-relief grating, and other parameters of the slanted surface-relief grating, such as the grating period, the slant angle, the duty cycle, the depth, and the like, may be configured to selectively diffract incident light within a certain incident angular range (e.g., FOV) and/or a certain wavelength band at certain diffraction directions (e.g., within an angular range shown by field of view 730). For example, when the refractive index modulation is large (e.g., >0.2), a large angular bandwidth (e.g., >10°) may be achieved at the output couplers to provide a sufficiently large eyebox for the waveguide-based near-eye display system.

The slanted surface-relief gratings with parameters and configurations (e.g., duty cycles or refractive index modulations) varying over the region of the grating described above and other surface-relief gratings (e.g., gratings used for eye-tracking) may be fabricated using many different nanofabrication techniques. The nanofabrication techniques generally include a patterning process and a post-patterning (e.g., over-coating) process. The patterning process may be used to form slanted ridges of the slanted grating. There may be many different nanofabrication techniques for forming the slanted ridges. For example, in some implementations, the slanted grating may be fabricated using lithography techniques including slanted etching. In some implementations, the slanted grating may be fabricated using nanoimprint lithography (NIL) molding techniques, where a master mold including slanted structures may be fabricated using, for example, slanted etching techniques, and may then be used to mold slanted gratings or different generations of soft stamps for nanoimprinting. The post-patterning process may be used to over-coat the slanted ridges and/or to fill the gaps between the slanted ridges with a material having a different refractive index than the slanted ridges. The post-patterning process may be independent from the patterning process. Thus, a same post-patterning process may be used on slanted gratings fabricated using any patterning technique.

Techniques and processes for fabricating slanted gratings described herein are for illustration purposes only and are not intended to be limiting. A person skilled in the art would understand that various modifications may be made to the techniques described below. For example, in some implementations, some operations described below may be omitted. In some implementations, additional operations may be performed to fabricate the slanted grating. Techniques disclosed herein may also be used to fabricate other slanted structures on various materials.

As described above, in some implementations, the slanted surface-relief grating may be fabricated using NIL molding techniques. In NIL molding, a substrate may be coated with an NIL material layer. The NIL material may include, for example, a heat sensitive material or an electromagnetic radiation sensitive material, such as a ultraviolet (UV) light-curable optical material. In one example, the NIL material may include a light-sensitive base resin that includes a base polymer and a functional group for polymerization during photo-curing (e.g., UV-curing). The NIL material mixture may also include some metal oxide nanoparticles (e.g., titanium oxide, zirconium oxide, etc.) for increasing the refractive index of the mixture. In some embodiments, the nanoparticles may include one or more metal oxide, such as titanium oxide, zirconium oxide, hafnium oxide, tungsten oxide, any derivatives thereof, or other metal oxide or derivatives thereof having relatively high refractive indices. In some embodiments, the nanoparticles may include zinc tellurium, gallium phosphide, or any derivatives thereof. Depending on the materials and/or composition when more than one type of nanoparticles may be used to form a blend of nanoparticles, the nanoparticles may have a refractive index between about 1.7 and about 3.4. The mixture may also include some optional additives and solvent. In general, the base resin material, such as the base polymer and the functional group of the base resin material, the nanoparticle material, and/or the loading of the nanoparticles with respect to other materials in the mixture (i.e., weight percentage of the nanoparticles in the cured NIL material) can be selected to tune the refractive index of the NIL material.

An NIL mold (e.g., a hard stamp, a soft stamp including a polymeric material, a hard-soft stamp, or any other working stamp) with a slanted structure may be pressed against the NIL material layer for molding a slanted surface-relief structure in the NIL material layer. A soft stamp (e.g., made of polymers) may offer more flexibility than a hard stamp during the molding and demolding processes. The NIL material layer may be cured subsequently using, for example, heat and/or ultraviolet (UV) light. The NIL mold may then be detached from the NIL material layer, and a slanted structure that is complementary to the slanted structure in the NIL mold may be formed in the NIL material layer.

Figure 8A:
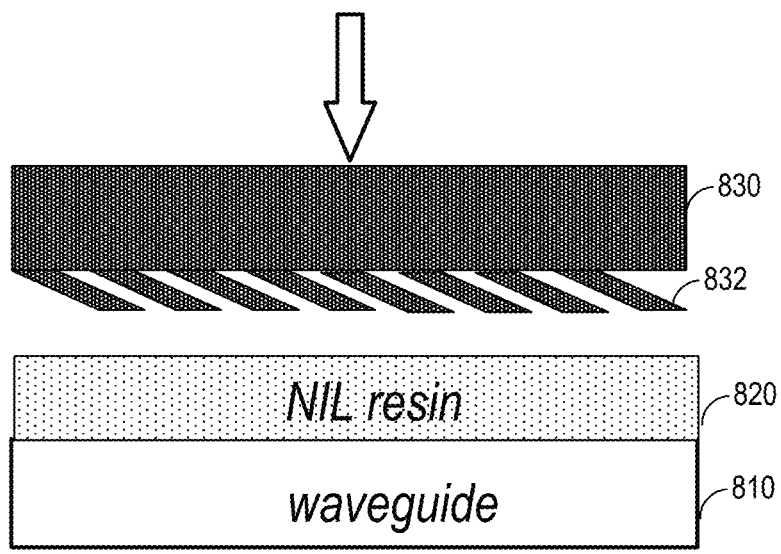
FIGS. 8A and 8B illustrate an example of a process for fabricating a slanted surface-relief grating by nanoimprint lithography according to certain embodiments.
Figure 8B:
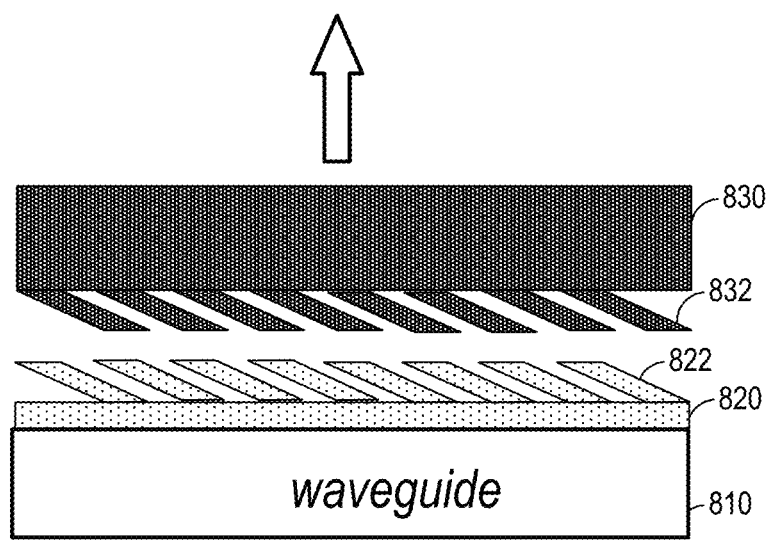

FIGS. 8A and 8B illustrate an example of a process for fabricating a slanted surface-relief grating by nanoimprint lithography according to certain embodiments. In FIG. 8A, a waveguide 810 may be coated with a NIL resin layer 820. NIL resin layer 820 may include, for example, a butyl-acrylate-based resin doped with a sol-gel precursor (e.g., titanium butoxide), a monomer containing a reactive functional group for subsequent infusion processes (such as acrylic acid), and/or high refractive index nanoparticles (e.g., $TiO_2$, GaP, $HfO_2$, GaAs, etc.). In some embodiments, NIL resin layer 820 may include polydimethylsiloxane (PDMS) or another silicone elastomer or silicon-based organic polymer. NIL resin layer 820 may be deposited on waveguide 810 by, for example, spin-coating, lamination, or ink injection. A NIL mold 830 with slanted ridges 832 may be pressed against NIL resin layer 820 and waveguide 810 for molding a slanted grating in NIL resin layer 820. NIL resin layer 820 may be cured subsequently (e.g., cross-linked) using heat and/or ultraviolet (UV) light.

FIG. 8B shows the demolding process, during which NIL mold 830 is detached from NIL resin layer 820 and waveguide 810. As shown in FIG. 8B, after NIL mold 830 is detached from NIL resin layer 820 and waveguide 810, a slanted grating 822 that is complementary to slanted ridges 832 in NIL mold 830 may be formed in NIL resin layer 820 on waveguide 810.

In some embodiments, a master NIL mold (e.g., a hard mold including a rigid material, such as Si, $SiO_2$, $Si_3N_4$, or a metal) may be fabricated first using, for example, slanted etching, micromachining, or 3-D printing. A soft stamp may be fabricated using the master NIL mold, and the soft stamp may then be used as the working stamp to fabricate the slanted grating or may be used to fabricate a next generation soft stamp. In such a process, the slanted grating structure in the master NIL mold may be similar to the slanted grating of the grating coupler for the waveguide display, and the slanted grating structure on the soft stamp may be complementary to the slanted grating structure in the master NIL mold and the slanted grating of the grating coupler for the waveguide display. Compared with a hard stamp or hard mold, a soft stamp may offer more flexibility during the molding and demolding processes.

Figure 9A:
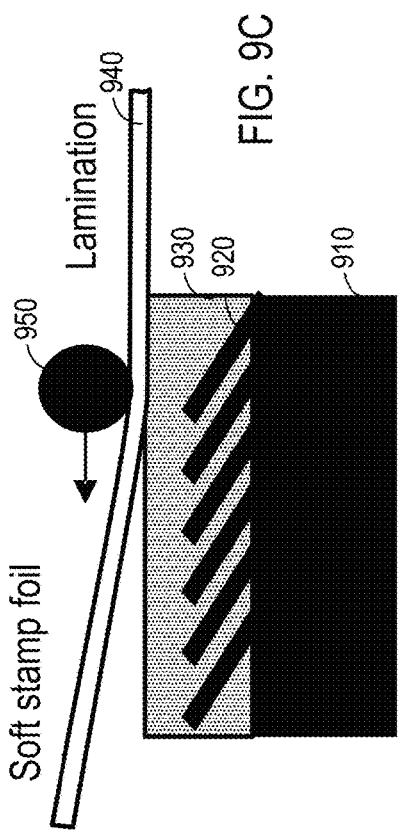
FIGS. 9A-9D illustrate an example of a process for fabricating a soft stamp used to make a slanted surface-relief grating according to certain embodiments.

FIGS. 9A-9D illustrate an example of a process 900 for fabricating a soft stamp used for making a slanted surface-relief grating according to certain embodiments. FIG. 9A shows a master mold 910 (e.g., a hard mold or hard stamp). Master mold 910 may include a rigid material, such as a semiconductor substrate (e.g., Si or GaAs), an oxide (e.g., $SiO_2$, $Si_3N_4$, $TiO_x$, $AlO_x$, $TaO_x$, or $HfO_x$), or a metal plate. Master mold 910 may be fabricated using, for example, a slanted etching process using reactive ion beams or chemically assisted reactive ion beams, a micromachining process, or a 3-D printing process. As shown in FIG. 9A, master mold 910 may include a slanted grating 920 that may in turn include a plurality of slanted ridges 922 with gaps 924 between slanted ridges 922.

Figure 9B:
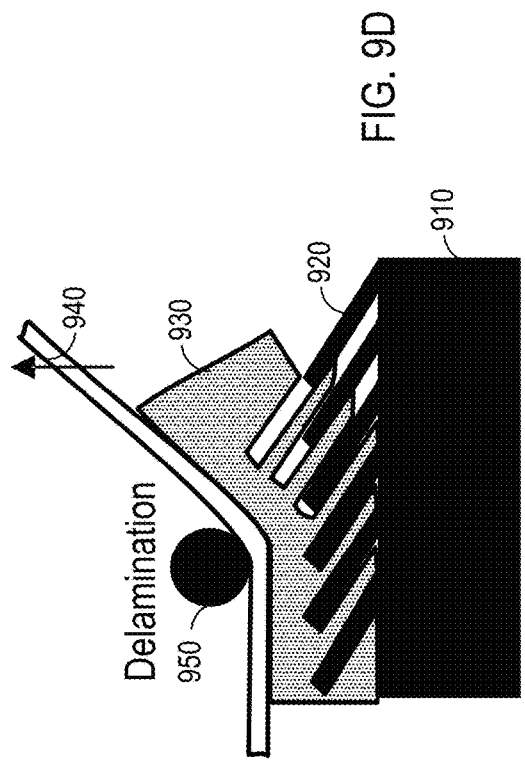

FIG. 9B illustrates master mold 910 coated with a soft stamp material layer 930. Soft stamp material layer 930 may include, for example, a resin material or a curable polymer material. In some embodiments, soft stamp material layer 930 may include polydimethylsiloxane (PDMS) or another silicone elastomer or silicon-based organic polymer. In some embodiment, soft stamp material layer 930 may include ethylene tetrafluoroethylene (ETFE), perfluoropolyether (PFPE), or other fluorinated polymer materials. In some embodiments, soft stamp material layer 930 may be coated on master mold 910 by, for example, spin-coating or ink injection.

Figure 9C:
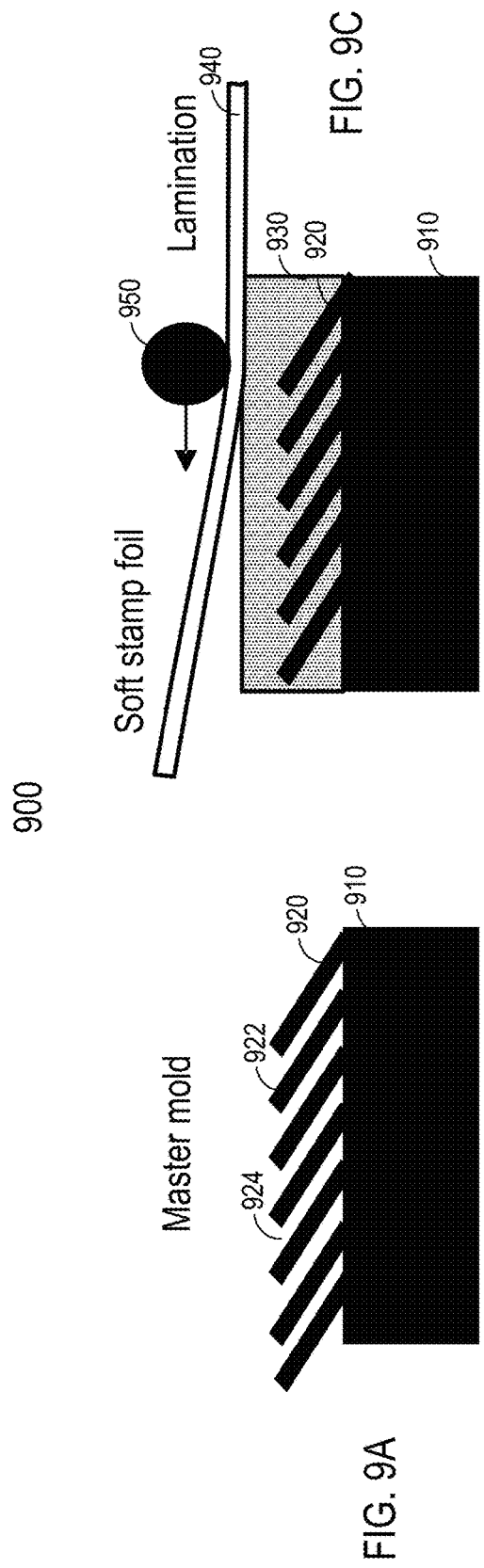

FIG. 9C illustrates a lamination process for laminating a soft stamp foil 940 onto soft stamp material layer 930. A roller 950 may be used to press soft stamp foil 940 against soft stamp material layer 930. The lamination process may also be a planarization process to make the thickness of soft stamp material layer 930 substantially uniform. After the lamination process, soft stamp foil 940 may be tightly or securely attached to soft stamp material layer 930.

Figure 9D:
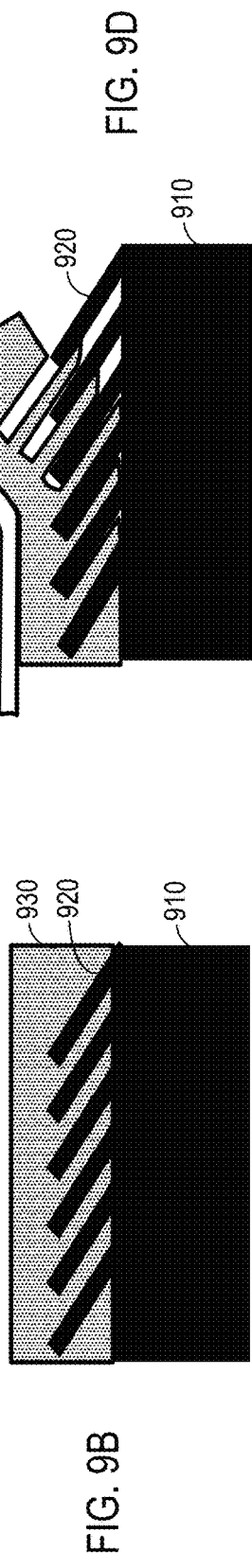

FIG. 9D illustrates a delamination process, where a soft stamp including soft stamp foil 940 and attached soft stamp material layer 930 is detached from master mold 910. Soft stamp material layer 930 may include a slanted grating structure that is complementary to the slanted grating structure on master mold 910. Because the flexibility of soft stamp foil 940 and attached soft stamp material layer 930, the delamination process may be relatively easy compared with a demolding process using a hard stamp or mold. In some embodiments, a roller (e.g., roller 950) may be used in the delamination process to ensure a constant or controlled delamination speed. In some embodiments, roller 950 may not be used during the delamination. In some implementations, an anti-sticking layer may be formed on master mold 910 before soft stamp material layer 930 is coated on master mold 910. The anti-sticking layer may also facilitate the delamination process. After the delamination of the soft stamp from master mold 910, the soft stamp may be used to mold the slanted grating on a waveguide of a waveguide display.

Figure 10A:
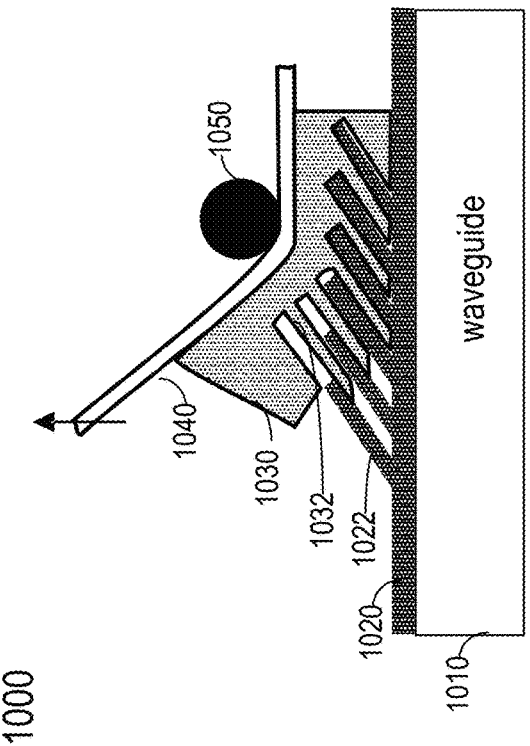
FIGS. 10A-10D illustrate an example of a process for fabricating a slanted surface-relief grating using a soft stamp according to certain embodiments.

FIGS. 10A-10D illustrate an example of a process 1000 for fabricating a slanted surface-relief grating using a soft stamp according to certain embodiments. FIG. 10A shows a waveguide 1010 coated with an imprint resin layer 1020. Imprint resin layer 1020 may include, for example, a butyl-acrylate based resin doped with a sol-gel precursor (e.g., titanium butoxide), a monomer containing a reactive functional group for subsequent infusion processes (such as acrylic acid), and/or high refractive index nanoparticles (e.g., $TiO_2$, GaP, $HfO_2$, GaAs, etc.). In some embodiments, imprint resin layer 1020 may include polydimethylsiloxane (PDMS) or another silicone elastomer or silicon-based organic polymer. In some embodiments, imprint resin layer 1020 may include ethylene tetrafluoroethylene (ETFE), perfluoropolyether (PFPE), or other fluorinated polymer materials. Imprint resin layer 1020 may be deposited on waveguide 1010 by, for example, spin-coating, lamination, or ink injection. A soft stamp 1030 including slanted ridges 1032 attached to a soft stamp foil 1040 may be used for the imprint.

Figure 10B:
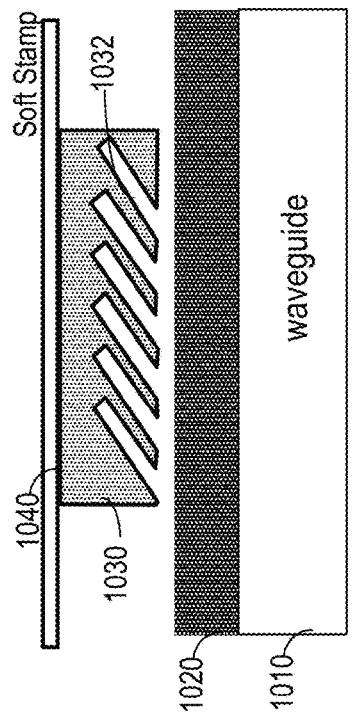

FIG. 10B shows the lamination of soft stamp 1030 onto imprint resin layer 1020. Soft stamp 1030 may be pressed against imprint resin layer 1020 and waveguide 1010 using a roller 1050, such that slanted ridges 1032 may be pressed into imprint resin layer 1020. Imprint resin layer 1020 may be cured subsequently. For example, imprint resin layer 1020 may be cross-linked using heat and/or ultraviolet (UV) light.

Figure 10C:
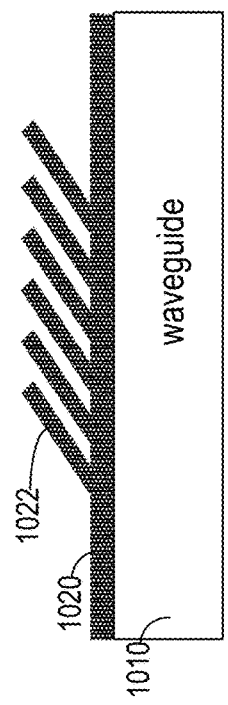

FIG. 10C shows the delamination of soft stamp 1030 from imprint resin layer 1020. The delamination may be performed by lifting soft stamp foil 1040 to detach slanted ridges 1032 of soft stamp 1030 from imprint resin layer 1020. Imprint resin layer 1020 may now include a slanted grating 1022, which may be used as the grating coupler or may be over-coated to form the grating coupler for the waveguide display. As described above, because of the flexibility of soft stamp 1030, the delamination process may be relatively easy compared with a demolding process using a hard stamp or mold. In some embodiments, a roller (e.g., roller 1050) may be used in the delamination process to ensure a constant or controlled delamination speed. In some embodiments, roller 1050 may not be used during the delamination.

Figure 10D:
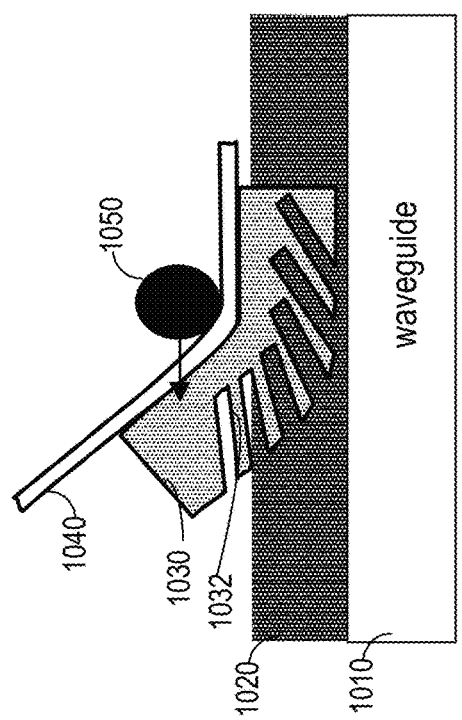

FIG. 10D shows an example imprinted slanted grating 1022 formed on waveguide 1010 using soft stamp 1030. As described above, slanted grating 1022 may include ridges and gaps between the ridges and thus may be over-coated with a material having a refractive index different from imprint resin layer 1020 to fill the gaps and form the grating coupler for the waveguide display.

In various embodiments, the period of the slanted grating may vary from one area to another on slanted grating 1022, or may vary from one period to another (i.e., chirped) on slanted grating 1022. Slanted grating 1022 may have a duty cycle ranging, for example, from about 10% to about 90% or greater. In some embodiments, the duty cycle may vary from period to period. In some embodiments, the depth or height of the ridges of slanted grating 1022 may be greater than 50 nm, 100 nm, 200 nm, 300 nm, 400 nm, or higher. The slant angles of the leading edges of the ridges of slanted grating 1022 and the slant angles of the trailing edges of the ridges of slanted grating 1022 may be greater than 30°, 45°, 60°, or higher. In some embodiments, the leading edge and training edge of each ridge of slanted grating 1022 may be parallel to each other. In some embodiments, the difference between the slant angle of the leading edge of a ridge of slanted grating 1022 and the slant angle of the trailing edge of the ridge of slanted grating 1022 may be less than 20%, 10%, 5%, 1%, or less.

In various embodiments, different generations of NIL stamps may be made and used as the working stamp to mold the slanted gratings. For example, in some embodiments, a master mold (which may be referred to as a generation 0 mold) may be fabricated (e.g., etched) in, for example, a semiconductor substrate, a quartz, or a metal plate. The master mold may be a hard stamp and may be used as the working stamp to mold the slanted grating directly, which may be referred to as hard stamp NIL or hard NIL. In such case, the slanted structure on the mold may be complimentary to the desired slanted structure of the slanted grating used as the grating coupler on a waveguide display.

In some embodiments, in order to protect the master NIL mold, the master NIL mold may be fabricated first, and a hybrid stamp (which may be referred to as generation 1 mold or stamp) may then be fabricated using the master NIL mold. The hybrid stamp may be used as the working stamp for nanoimprinting. The hybrid stamp may include a hard stamp, a soft stamp, or a hard-soft stamp. Nanoimprinting using a soft stamp may be referred to as soft stamp NIL or soft NIL. In some embodiments, the hybrid mold may include a plastic backplane with soft or hard patterned polymer (e.g., having a Young's modulus about 1 GPa). In some embodiments, the hybrid mold may include a glass backplane with soft or hard patterned polymer (e.g., having a Young's modulus about 1 GPa). In some embodiments, the hybrid mold may include a glass/plastic laminated backplane with soft or hard patterned polymer.

In some embodiments, a generation 2 hybrid mold may be made from the generation 1 mold, and may then be used as the working stamp for the nanoimprinting. In some embodiments, generation 3 hybrid molds, generation 4 hybrid molds, and the like, may be made and used as the working stamp. NIL molding may significantly reduce the cost of making the slanted surface-relief structures because the molding process may be much shorter than the etching process and no expensive reactive ion etching equipment may be needed.

Figure 11:
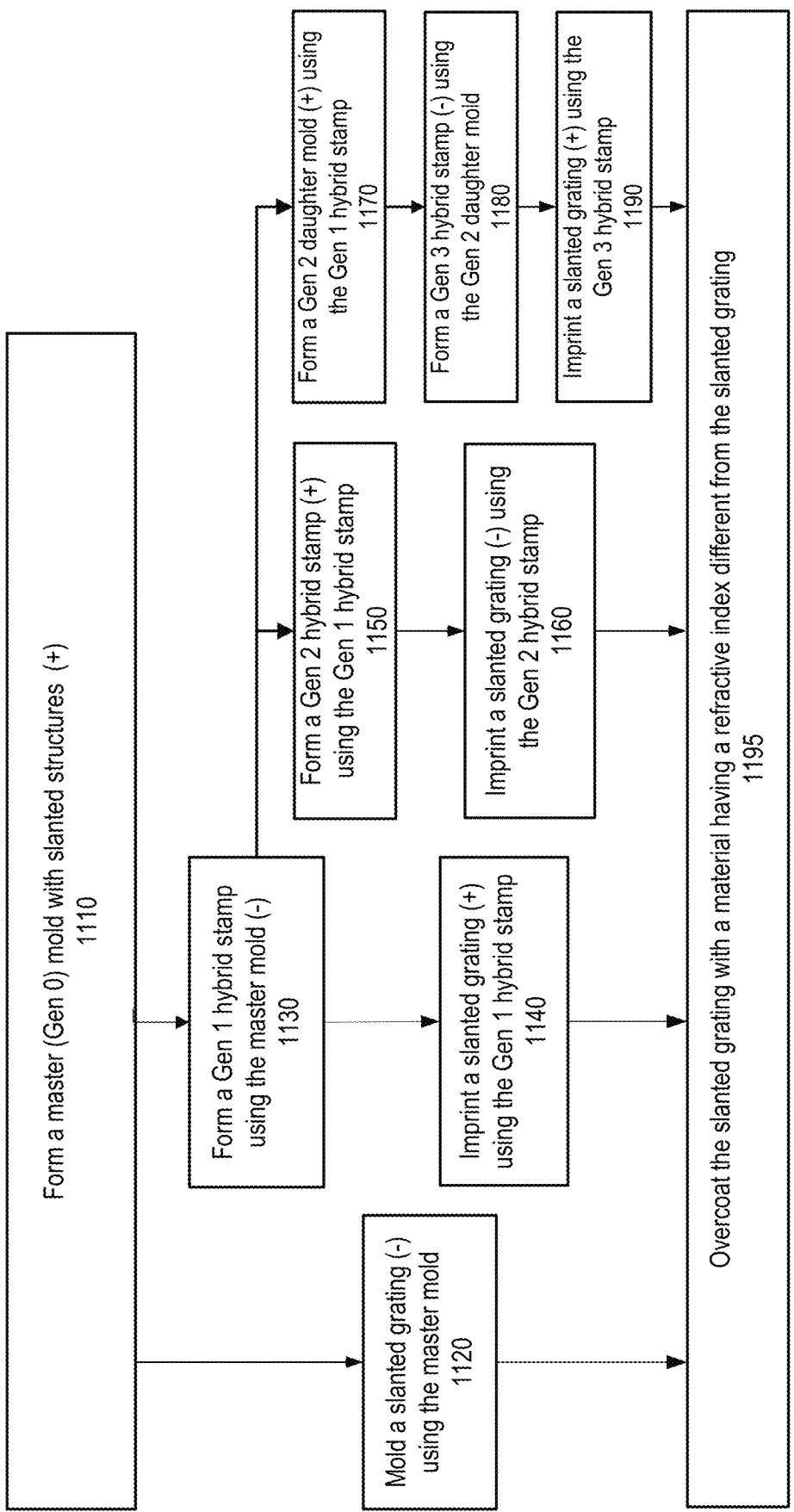
FIG. 11 is a simplified flow chart illustrating an example of a method of fabricating a slanted surface-relief grating using nanoimprint lithography according to certain embodiments.

FIG. 11 is a simplified flowchart 1100 illustrating example methods of fabricating a slanted surface-relief grating using nanoimprint lithography according to certain embodiments. As described above, different generations of NIL stamps may be made and used as the working stamp to mold the slanted gratings. For example, in some embodiments, a master mold (i.e., generation 0 mold, which may be a hard mold) may be used as the working stamp to mold the slanted grating directly. In some embodiments, a hybrid stamp (e.g., a generation 1 hybrid mold or stamp) may be fabricated using the master mold and may be used as the working stamp for nanoimprinting. In some embodiments, a generation 2 hybrid mold (or stamp) may be made from the generation 1 mold, and may be used as the working stamp for the nanoimprinting. In some embodiments, a generation 3 mold, a generation 4 mold, and so on, may be made and used as the working stamp.

At block 1110, a master mold with a slanted structure may be fabricated using, for example, a slanted etching process that uses reactive ion beams or chemically-assisted reactive ion beams, a micromachining process, or a 3-D printing process. The master mold may be referred to as the generation 0 (or Gen 0) mold. The master mold may include quartz, fused silica, silicon, other metal-oxides, or plastic compounds. The slanted structure of the master mold may be referred to as having a positive (+) tone. The master mold may be used as a working stamp for molding the slanted grating directly (i.e., hard NIL) at block 1120. As described above, when the master mold is used as the working stamp, the slanted structure of the master mold may be complementary to the desired slanted grating. Alternatively, the master mold may be used to make a hybrid stamp as the working stamp for molding the slanted grating. The slanted structure of the hybrid stamp may be similar to the desired slanted grating or may be complementary to the desired slanted grating, depending on the generation of the hybrid stamp.

At block 1120, a slanted grating may be molded in, for example, a resin layer using the master mold as described above with respect to, for example, FIGS. 9A and 9B. The resin layer may be coated on a waveguide substrate, and may include, for example, a butyl-acrylate based resin doped with a resin comprising a sol-gel precursor (e.g., titanium butoxide), a monomer containing a reactive functional group for subsequent infusion processes (such as acrylic acid), and/or high refractive index nanoparticles (e.g., $TiO_2$, GaP, $HfO_2$, GaAs, etc.). The master mold may be pressed against the resin layer. The resin layer may then be cured to fix the structure formed within the resin layer by the master mold. The master mold may be detached from the resin layer to form a slanted grating within the resin layer. The slanted grating within the resin layer may have a negative (−) tone compared with the slanted structure of the master mold.

Alternatively, at block 1130, a hybrid stamp (e.g., a hard stamp, a soft stamp, or a hard-soft stamp) with a slanted structure may be fabricated using the master mold as described above with respect to, for example, FIGS. 9A-9D or the process described with respect to, for example, FIGS. 10A-10D. For example, the process of fabricating the hybrid stamp may include coating the master mold with a soft stamp material, such as a resin material described above. A soft stamp foil may then be laminated on the soft stamp material, for example, using a roller. The soft stamp foil and the attached soft stamp material may be securely attached to each other and may be detached from the master mold to form the soft stamp. The hybrid stamp fabricated at block 1130 may be referred to as a generation 1 (or Gen 1) stamp. The slanted grating within the Gen 1 stamp may have a negative (−) tone compared with the slanted structure of the master mold.

At block 1140, a slanted surface-relief grating may be imprinted using the Gen 1 stamp as described above with respect to, for example, FIGS. 9A-9D. For example, a waveguide substrate may be coated with an imprint resin layer. The Gen 1 stamp may be laminated on the imprint resin layer using, for example, a roller. After the imprint resin layer is cured, the Gen 1 stamp may be delaminated from the imprint resin layer to form a slanted grating within the imprint resin layer. The slanted grating within the imprint resin layer may have a positive tone.

Alternatively, in some embodiments, at block 1150, a second generation hybrid stamp (Gen 2 stamp) may be fabricated using the Gen 1 stamp using a process similar to the process for fabricating the Gen 1 stamp as described above with respect to, for example, FIGS. 9A-9D. The slanted structure within the Gen 2 stamp may have a positive tone.

At block 1160, a slanted surface-relief grating may be imprinted using the Gen 2 stamp as described above with respect to, for example, FIGS. 9A-9D. For example, a waveguide substrate may be coated with an imprint resin layer. The Gen 2 stamp may be laminated on the imprint resin layer using, for example, a roller. After the imprint resin layer is cured, the Gen 2 stamp may be delaminated from the imprint resin layer to form a slanted grating within the imprint resin layer. The slanted grating within the imprint resin layer may have a negative tone.

Alternatively, in some embodiments, at block 1170, a second generation (Gen 2) daughter mold may be fabricated using the Gen 1 stamp using a process similar to the process for fabricating the Gen 1 stamp as described above with respect to, for example, FIGS. 9A-9D. The slanted structure within the Gen 2 daughter mold may have a positive tone.

At block 1180, a third generation hybrid stamp (Gen 3 stamp) may be fabricated using the Gen 2 daughter mold using a process similar to the process for fabricating the Gen 1 stamp or the Gen 2 daughter mold as described above with respect to, for example, FIGS. 9A-9D. The slanted structure within the Gen 3 stamp may have a negative tone.

At block 1190, a slanted surface-relief grating may be imprinted using the Gen 3 stamp as described above with respect to, for example, FIGS. 10A-10D. For example, a waveguide substrate may be coated with an imprint resin layer. The Gen 3 stamp may be laminated on the imprint resin layer using, for example, a roller. After the imprint resin layer is cured, the Gen 3 stamp may be delaminated from the imprint resin layer to form a slanted grating within the imprint resin layer. The slanted grating within the imprint resin layer may have a positive tone.

Even though not shown in FIG. 11, in some embodiments, a fourth generation hybrid stamp, a fifth generation hybrid stamp, and so on, may be fabricated using a similar process, and may be used as the working stamp for imprinting the slanted grating. In some implementations, the surface of any of the master mold, gen 1 stamp, Gen 2 stamp, and Gen 3 stamp may be coated or plated prior to imprinting to reduce wearing of the mold, improve product quality, and reduce manufacturing cost. For example, in some implementations, an anti-sticking layer may be coated on the mold before the molding (or imprinting) process.

Optionally, at block 1195, the slanted grating may be over-coated with a material having a refractive index different from the slanted grating (e.g., the imprint resin layer). For example, in some embodiments, a high refractive index material, such as Hafnia, Titania, Tungsten oxide, Zirconium oxide, Gallium sulfide, Gallium nitride, Gallium phosphide, silicon, or a high refractive index polymer, may be used to over-coat the slanted grating and fill the gaps between the slanted grating ridges. In some embodiments, a low refractive index material, such as silicon oxide, magnesium fluoride, porous silica, or fluorinated low index monomer (or polymer), and the like, may be used to over-coat the slanted grating and fill the gaps between the slanted grating ridges.

As described above, an NIL material or NIL material mixture may include a base resin, nanoparticles, and radical or acid generator. Optionally, the NIL material may further include additives for modifying the properties of the NIL material and solvent for facilitating the mixing of the various components. The NIL material may be applied or deposited by, for example, spin-coating, lamination, or ink injection on a substrate or waveguide to form an NIL material layer, which may be molded using any of the NIL processes described herein and cured by light to form an NIL-molded nanostructure, such as a slanted surface-relief grating.

The base resin of the NIL material may include an electromagnetic radiation sensitive material, such as a light-curable optical material. For example, the base resin may include a light-sensitive or light-curable base resin that may include monomers, oligomers, or polymers having one or more aromatic and thio-aromatic units, such as monomers, oligomers, or polymers of one or more derivatives from bisfluorene, dithiolane, thianthrene, biphenol, o-phenylphenol, phenoxy benzyl, bisphenol A, bisphenol F, benzyl, phenol, and the like. Depending on the base material forming the base resin, the base resin may have a refractive index between, for example, about 1.5 and about 1.8.

In some embodiments, different base resin materials may include a common base material and different functional groups, including but not limited to cross-linking functional groups, such as ethylenically unsaturated group, oxirane ring, and the like. Depending on the cross-linking functional group a base resin may contain, the base resin may be cross-linked or polymerized via radical photopolymerization (such as free radical photopolymerization or controlled radical photopolymerization), or ionic photopolymerization (such as cationic photopolymerization or anionic photopolymerization). For example, a base resin containing the ethylenically unsaturated group may be cross-linked or polymerized via radical photopolymerization, such as free radical photopolymerization. To facilitate the polymerization of a base resin containing the ethylenically unsaturated group, the NIL material mixture may further include one or more photo-radical generators (PRGs). Under UV radiation, the PRGs may generate radicals that can initiate the polymerization or cross-linking process of the ethylenically unsaturated group of the base resin molecules. When the base resin contains the oxirane ring, the base resin may be cross-linked or polymerized via ionic photopolymerization, such as cationic photopolymerization. To facilitate the polymerization of a base resin containing the oxirane ring, the NIL material mixture may further include one or more photo-acid generators (PAGs). Under UV radiation, the PAGs may generate cations or acids that can initiate the polymerization or cross-linking process of the oxirane ring of the base resin molecules. In a conventional NIL process, a uniform UV light beam may generally be used to uniformly cure the nanoimprint material, polymerize the monomers, and fix the imprinted grating.

FIGS. 12A-12C illustrate an example of a process for curing a photosensitive nanoimprint material according to certain embodiments. In order to modify the refractive index of an imprinted grating differently at different regions, the light beam used for curing the imprinted grating may have a desired intensity pattern. The curing may be performed before or after the demolding process described above. FIG. 12A schematically illustrates a nanoimprint material layer 1210 before photo curing. FIG. 12B schematically illustrates nanoimprint material layer 1210 being cured by a light pattern according to certain embodiments. FIG. 12C schematically illustrates nanoimprint material layer 1210 after being cured by a light pattern for a certain time period according to certain embodiments.

In the example shown in FIGS. 12A-12C, nanoimprint material layer 1210 may be deposited or coated on a substrate 1220. In some embodiments, nanoimprint material layer 1210 may be pre-cured, for example, thermally or optically, to form a polymer matrix 1230 that may provide the mechanical support for the particles and monomers in the nanoimprint material. Nanoimprint material layer 1210 may include polymer matrix 1230, monomers 1240, and one or more polymerization initiating agents (not shown) dispersed or suspended in polymer matrix 1230. Monomers 1240 may be photosensitive or photo-polymerizable, and may polymerize upon exposure to light with the aid of the polymerization initiating agents. Polymer matrix 1230 and monomers 1240 may have different refractive indices.

Polymer matrix 1230 in nanoimprint material layer 1210 may be formed by monomers of a matrix material (or a matrix precursor) at a first polymerization stage, where the monomers of the matrix material may be cured to polymerize via, e.g., thermal curing, to form the polymer matrix, while some other monomers 1240 may remain monomers. As shown In FIG. 12A, monomers 1240 may be dispersed in the polymer matrix 1230 in a substantially uniform manner such that nanoimprint material layer 1210 may have a substantially uniform refractive index (at least in the region shown in FIG. 12A). The refractive index of nanoimprint material layer 1210 may be modulated by subsequent exposure to curing light. It is noted that the grid pattern of polymer matrix 1230 shown in FIGS. 12A-12C is for illustration purpose only, and is not intended to limit polymer matrix 1230 to any specific pattern. Similarly, the arrangement of monomers 1240 shown in FIGS. 12A-12C is not intended to limit the actual arrangement of monomers 1240 in polymer matrix 1230 to any specific pattern.

As shown in FIG. 12B, during exposure to a light beam 1250, such as a UV light pattern, monomers 1240 may redistribute according to the light pattern and polymerize inside polymer matrix 1230. For example, monomers 1240 may redistribute or diffuse towards the regions exposed to bright regions in the light pattern and to polymerize in these exposed regions. The redistribution and polymerization of monomers 1240 may cause the refractive index of nanoimprint material layer 1210 to change based on the light pattern. The light pattern can be generated using a photomask or by two interfering beams. For example, the two interfering beams may generate an interference pattern in nanoimprint material layer 1210, creating exposed bright regions (e.g., bright fringes) and unexposed dark regions (e.g., dark fringes) in nanoimprint material layer 1210.

As mentioned above, nanoimprint material layer 1210 may include one or more polymerization initiating agents. The polymerization initiating agents may include photosensitizing dyes, initiators, chain transfer agents, etc. Monomers 1240 may react with the polymerization initiating agents and polymerize. For example, for polymerization upon exposure to light, the polymerization initiating agents may include photosensitizing dyes and initiators. Upon exposure, the photosensitizing dyes may absorb light and interact with the initiators to transfer energy to the initiators to generate active species, which may include radicals, cation (acid), and/or anion (base), depending on the polymerization initiating agents. The active species may then initiate the polymerization of monomers 1240.

Because the active species are generated in the exposed bright regions, the polymerization of monomers 1240 may occur in the exposed bright regions. As monomers 1240 polymerize, the concentration of the unreacted monomers 1240 in the exposed bright regions may reduce, forming a concentration or density gradient of monomers 1240 across the exposed bright regions and the unexposed dark regions, which may in turn cause monomers 1240 in the unexposed dark regions to re-distribute or diffuse to the exposed bright regions, as shown FIG. 12B.

As shown in FIG. 12C, after the exposure to a curing light pattern for a certain period of time, such as light beam 1250, the refractive index of nanoimprint material layer 1210 may be changed according to the curing light pattern. For example, in regions 1260 that are exposed to the bright fringes of the light pattern, the refractive index may be higher than the refractive index before the curing. In contrast, in regions 1270 that are in the dark fringes of the light pattern, the refractive index may be lower than the refractive index before the curing. Thus, after the photo curing, the imprinted grating may have different refractive index modulations at different regions.

Figure 13A:
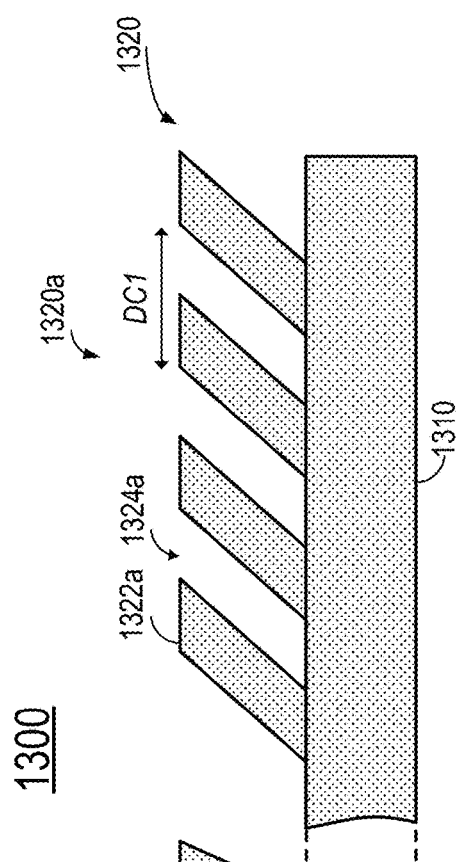
FIG. 13A illustrates an example of an imprinted slanted surface-relief structure according to certain embodiments.

FIG. 13A illustrates an example of an imprinted slanted surface-relief structure 1300 according to certain embodiments. Surface-relief structure 1300 may include abase layer 1310 and a grating region 1320. Base layer 1310 and grating region 1320 may include a same material, such as an organic resin material for nanoimprinting as described above. Grating region 1320 may include a straight or slanted surface-relief grating that may be uniform or non-uniform across grating region 1320. In the example shown in FIG. 13A, the configuration of the surface-relief grating may vary across grating region 1320 so as to improve the performance of the system using surface-relief structure 1300. For example, a region 1320a of the surface-relief grating may have a grating duty cycle DC1 that is different from the grating duty cycle DC2 of another region 1320b of surface-relief grating. Thus, the widths of grating ridges 1322a and 1322b and/or the widths of the grating grooves 1324a and 1324b may be different. The grating period in region 1320a and the grating period in region 1320b may also be different. However, because the surface-relief grating is imprinted using a same substantially uniformly mixed material, the refractive index modulation (e.g., Δn) may be the same across grating region 1320.

Figure 13B:
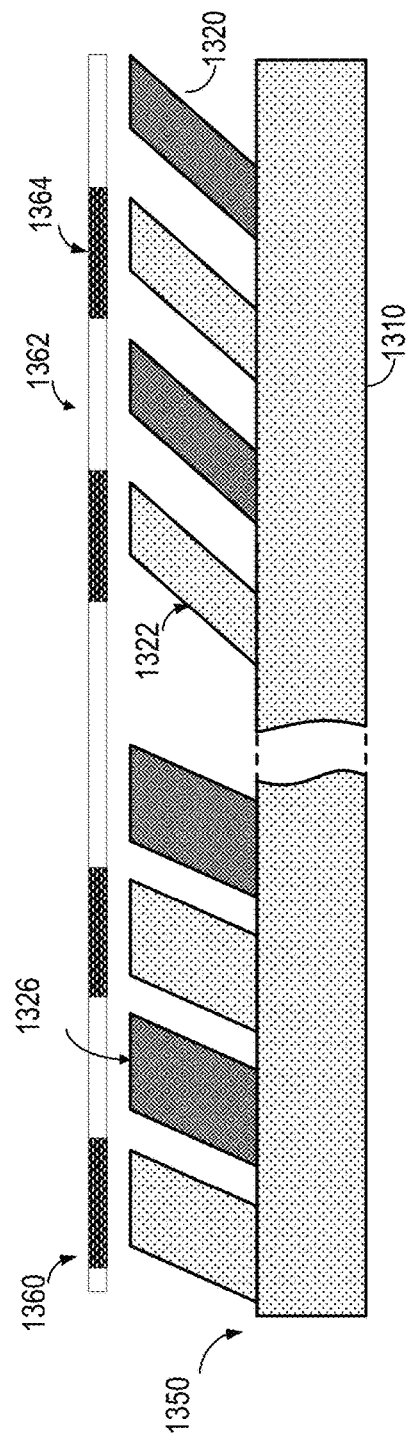
FIG. 13B illustrates an example of an imprinted slanted surface-relief structure with refractive index modulation patterned using a mask according to certain embodiments.

FIG. 13B illustrates an example of an imprinted slanted surface-relief structure 1350 with refractive index modulation patterned using a mask 1360 according to certain embodiments. Surface-relief structure 1350 may be made from surface-relief structure 1300 after selectively curing certain regions of surface-relief structure 1300 using mask 1360. Mask 1360 may include substantially transparent regions 1362 that have high transmissivity for curing light, such as UV light. Mask 1360 may also include opaque regions 1364 that may be substantially opaque to the UV curing light. Mask 1360 may be aligned with surface-relief structure 1300 and may then be exposed to uniform UV curing light. The UV curing light may pass through transparent regions 1362 and polymerize monomers in the nanoimprint material under transparent regions 1362 and increase the refractive index in grating ridges 1326 under transparent regions 1362. In opaque regions 1364, the UV curing light may not pass through mask 1360 and thus may not cure the nanoimprint material or may not increase the refractive index of grating ridges 1322 under opaque regions 1364. Thus, surface-relief structure 1350 may have different refractive index modulations at different regions. For example, in the example shown in FIG. 13B, surface-relief structure 1350 may include two gratings that are interdigitally multiplexed or interleaved, where one grating may correspond to regions of surface-relief structure 1350 under transparent regions 1362 and may have a higher refractive index modulation than a second grating that corresponds to regions of surface-relief structure 1350 under opaque regions 1364.

In some embodiments, the refractive index modulation pattern may be more complex than that in the example shown in FIG. 13B. The complex refractive index modulation pattern may be formed using a complex mask, multiple curing processes using multiple masks, a gray-scale mask, or a structured light pattern generated by the interference between two beams or by a diffractive optical element.

FIGS. 14A and 14B illustrate an example of a method of patterning the refractive index modulation (Δn) in an imprinted slanted surface-relief structure 1400 using masks according to certain embodiments. FIG. 14A illustrates surface-relief structure 1400 after a nanoimprinting process and a first UV curing process using a first mask 1430. Surface-relief structure 1400 may include a base layer 1410 and a grating region 1420. Base layer 1410 and grating region 1420 may include a same material, such as an organic resin material for nanoimprinting as described above. Grating region 1420 may include a straight or slanted surface-relief grating that may be uniform or non-uniform across grating region 1420. For example, in the example shown in FIG. 14A, grating region 1420 may include a plurality of slanted grating ridges 1422 that may have same or different width, depth, slant angle, and the like. Because the surface-relief grating is imprinted using a same substantially uniformly mixed material, the refractive index modulation (e.g., Δn) of grating region 1420 may be the same across grating region 1420 after the nanoimprint lithography.

First mask 1430 may include substantially transparent regions 1432 that have high transmissivity for curing light, such as UV light. First mask 1430 may also include opaque regions 1434 that may be substantially opaque to UV curing light. First mask 1430 may be aligned with surface-relief structure 1400 and may then be exposed to uniform UV curing light. The UV curing light may pass through transparent regions 1432 and polymerize monomers in the nanoimprint material under transparent regions 1432 and increase the refractive index in grating ridges 1424 under transparent regions 1462. In opaque regions 1464, the UV curing light may not pass through mask 1460 and thus may not cure the nanoimprint material or increase the refractive index of grating ridges 1422 under opaque regions 1464. Thus, surface-relief structure 1450 may have different refractive index modulations at different regions.

In a second curing process shown in FIG. 14B, a second mask 1440 may be used. Second mask 1440 may include substantially transparent regions 1442 that have high transmissivity for curing light, such as UV light. Second mask 1440 may also include opaque regions 1444 that may be substantially opaque to UV curing light. Second mask 1440 may be aligned with surface-relief structure 1400 and may be exposed to uniform UV curing light. The UV curing light may pass through transparent regions 1442, polymerize monomers in the nanoimprint material under transparent regions 1442, and increase the refractive index in grating ridges 1426 under transparent regions 1442 as described above. In opaque regions 1444, the UV curing light may not pass through second mask 1440 and thus may not cure the nanoimprint material or increase the refractive index of grating ridges 1422 and 1424 under opaque regions 1464. The exposure dosage in the second curing process may be different from the exposure dosage in the first curing process, and thus the refractive index change in grating ridges 1426 may be different from the refractive index change in grating ridges 1424.

Thus, surface-relief structure 1400 may have different refractive index modulations at different regions. For example, in the example shown in FIG. 14B, surface-relief structure 1400 may include three gratings that are interdigitally multiplexed or interleaved, where a first grating may include grating ridges 1422 and may have a lowest refractive index modulation, a second grating may include grating ridges 1424 and may have a highest refractive index modulation, and a third grating may include grating ridges 1426 and may have an intermediate refractive index modulation. Surface-relief structure 1400 may have a more complex refractive index modulation pattern if surface-relief structure 1400 is cured using more masks or a more complex mask.

Figure 15:
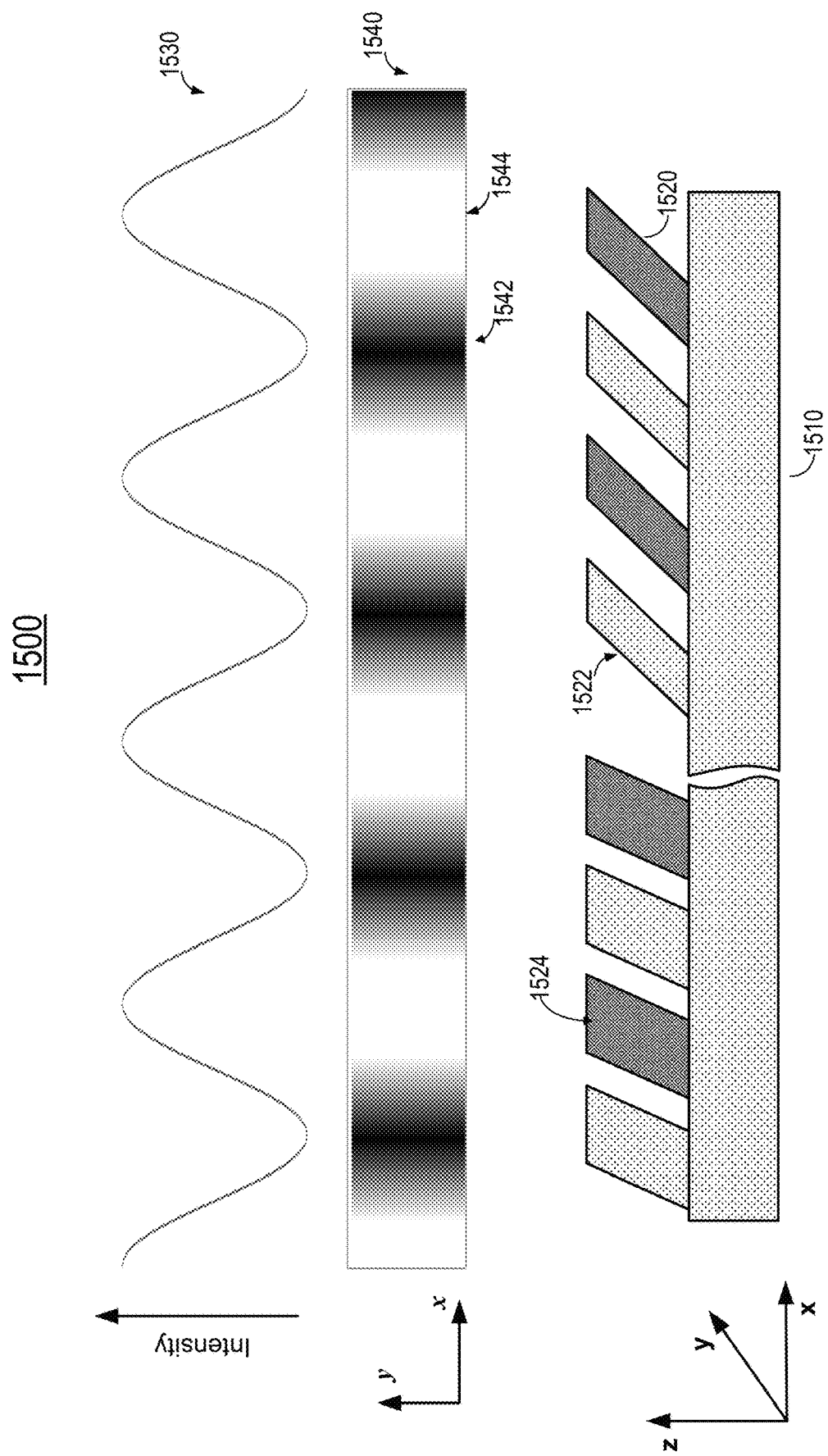
FIG. 15 illustrates an example of a method of patterning the refractive index modulation in an imprinted slanted surface-relief structure using a light pattern according to certain embodiments.

FIG. 15 illustrates an example of a method of patterning the refractive index modulation in an imprinted slanted surface-relief structure 1500 using a light pattern according to certain embodiments. Surface-relief structure 1500 may include a base layer 1510 and a grating region 1520. Base layer 1510 and grating region 1520 may include a same material, such as an organic resin material for nanoimprinting as described above. Grating region 1520 may include a straight or slanted surface-relief grating that may be uniform or non-uniform across grating region 1520. For example, in the example shown in FIG. 15, grating region 1520 may include a plurality of slanted grating ridges 1522 that may have same or different width, depth, slant angle, and the like. Because the surface-relief grating is imprinted using a same substantially uniformly mixed material, the refractive index modulation (e.g., Δn) of grating region 1520 may be the same across grating region 1520 after the nanoimprint lithography.

A UV curing light beam having an intensity pattern as shown by an intensity curve 1530 and a light pattern 1540 may be used to selectively cure different regions of surface-relief structure 1500. Light pattern 1540 may include bright fringes 1544 and dark fringes 1542, and may be formed by two interfering beams. Surface-relief structure 1500 may be exposed to light pattern 1540. Some grating ridges 1524 of the surface-relief grating may be exposed to bright fringes 1544 and thus may change their refractive indices. The refractive index of other grating fringes that are not exposed to bright fringes 1544 may remain unchanged. Thus, surface-relief structure 1500 may include a first grating that includes grating ridges 1522, and a second grating that includes grating ridges 1524 and has a higher refractive index modulation, where grating ridges 1522 and grating ridges 1524 are interleaved.

Figure 16:
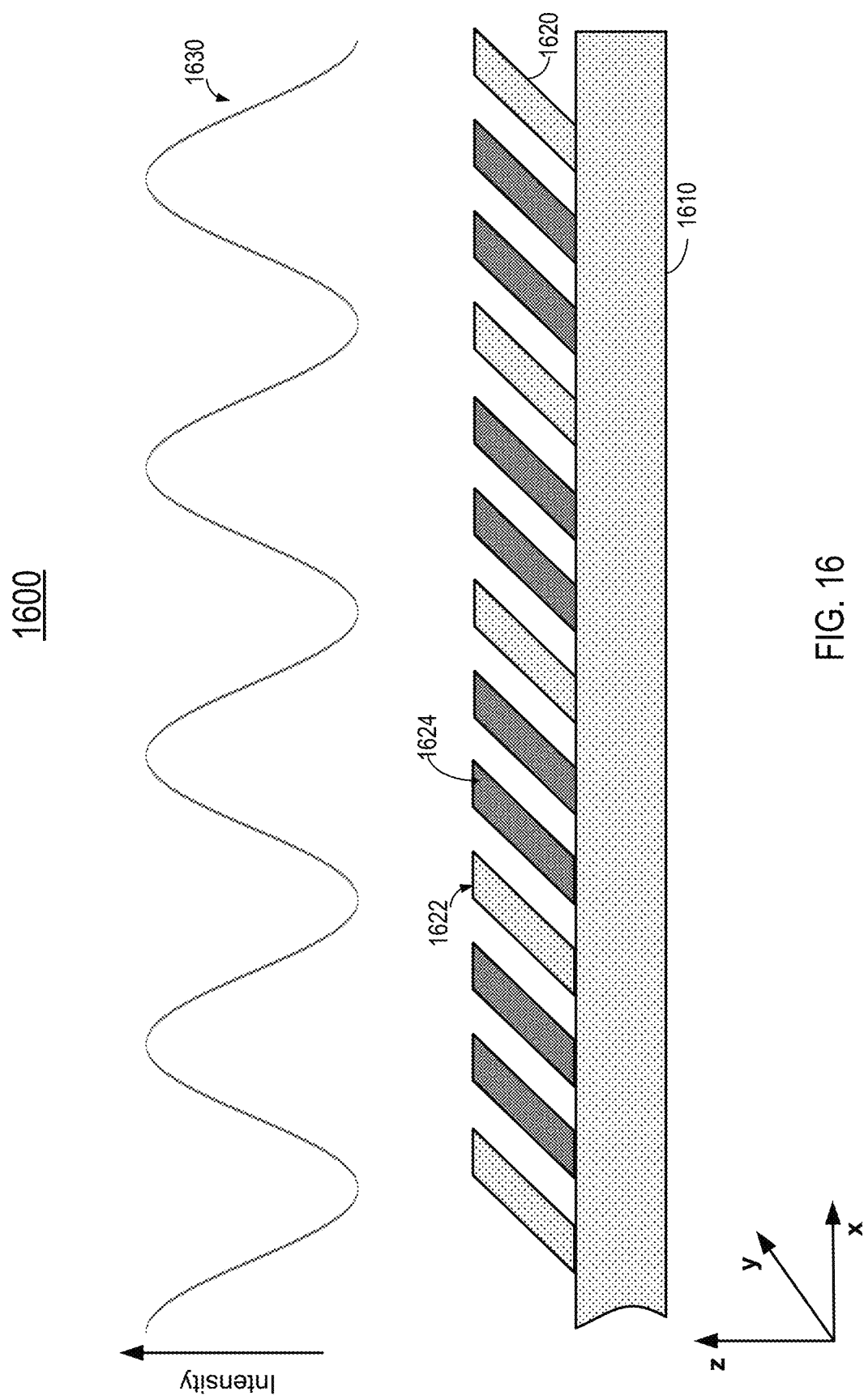
FIG. 16 illustrates an example of a method of patterning the refractive index modulation in an imprinted slanted surface-relief structure using a light pattern according to certain embodiments.

FIG. 16 illustrates another example of a method of patterning the refractive index modulation in an imprinted slanted surface-relief structure 1600 using a light pattern according to certain embodiments. Surface-relief structure 1600 may include a base layer 1610 and a grating region 1620. Base layer 1610 and grating region 1620 may include a same material, such as an organic resin material for nanoimprinting as described above. Grating region 1620 may include a straight or slanted surface-relief grating that may be uniform or non-uniform across grating region 1620. Grating region 1620 may include a plurality of slanted grating ridges 1622 that may have the same or different width, depth, slant angle, and the like. Because the surface-relief grating is imprinted using a same substantially uniformly mixed material, the refractive index modulation (e.g., Δn) of grating region 1620 may be the same across grating region 1620 after the nanoimprint lithography.

A UV curing light beam having an intensity pattern as shown by an intensity curve 1630 may be used to selectively cure different regions of surface-relief structure 1600. For example, in regions that include grating ridges 1622, the light intensity of the UV curing light beam may be low and thus the refractive index change may be very small. In regions that include grating ridges 1624, the light intensity of the UV curing light beam may be high and thus the refractive index change may be high. As such, the refractive index modulation of surface-relief structure 1600 may vary according to the intensity pattern shown by intensity curve 1630. Thus, the refractive index modulation may change gradually, rather than in steps. In some embodiments, the refractive index modulation may not change if the exposure dose is below a threshold value.

Figure 17:
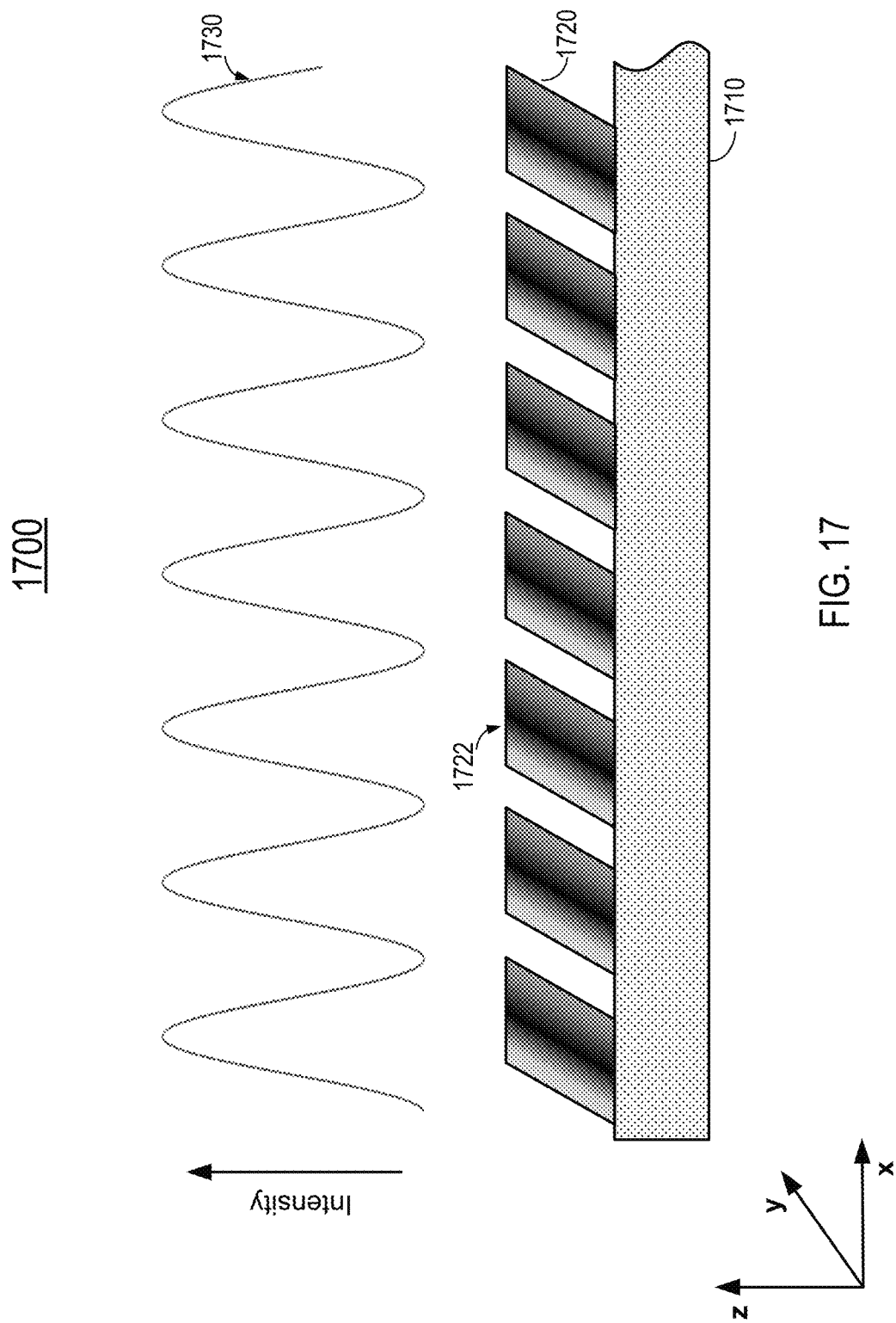
FIG. 17 illustrates an example of a method of patterning the refractive index modulation in an imprinted slanted surface-relief structure using a light pattern according to certain embodiments.

FIG. 17 illustrates another example of a method of patterning the refractive index modulation in an imprinted slanted surface-relief structure 1700 using a light pattern according to certain embodiments. Surface-relief structure 1700 may include a base layer 1710 and a grating region 1720. Base layer 1710 and grating region 1720 may include a same material, such as an organic resin material for nanoimprinting as described above. Grating region 1720 may include a straight or slanted surface-relief grating that may be uniform or non-uniform across grating region 1720. Grating region 1720 may include a plurality of slanted grating ridges 1722 that may have the same or different width, depth, slant angle, and the like. Because the surface-relief grating is imprinted using a same substantially uniformly mixed material, the refractive index modulation (e.g., Δn) of grating region 1720 may be the same across grating region 1720 after the nanoimprint lithography.

A UV curing light beam having an intensity pattern as shown by an intensity curve 1730 may be used to cure regions of surface-relief structure 1700. In the example shown in FIG. 17, different regions of a grating ridge 1722 may be exposed to UV light of different intensities and thus may have different refractive index changes that correspond to the exposure dosage as described above.

In the embodiments described above with respect to FIGS. 13A-17, the refractive index modulation of the surface-relief structure may vary in the x and/or y directions (e.g., the length and/or width directions of the surface-relief structure). In some embodiments, the refractive index modulation of the surface-relief structure may also vary in the z direction (e.g., the thickness direction). For example, the refractive index of the grating ridges may be different at different heights.

FIG. 18 illustrates an example of a method of changing the refractive index modulation in the thickness direction of an imprinted slanted surface-relief structure 1800 according to certain embodiments. Surface-relief structure 1800 may include a base layer 1810 and a grating region 1820. Base layer 1810 and grating region 1820 may include a same material, such as an organic resin material for nanoimprinting as described above. Grating region 1820 may include a straight or slanted surface-relief grating that may be uniform or non-uniform across grating region 1820. Grating region 1820 may include a plurality of slanted grating ridges 1822 that may have the same or different width, depth, slant angle, and the like. Because the surface-relief grating is imprinted using a same substantially uniformly mixed material, the refractive index modulation (e.g., Δn) of grating region 1820 may be the same across grating region 1820 after the nanoimprint lithography.

Surface-relief structure 1800 made by the NIL process may be cured by a converging or diverging light beam that may have different light intensities along the propagation direction (e.g., z direction) of the light beam. Thus, grating ridges 1822 may be exposed to light of different intensities at different heights of grating ridges 1822, and hence may have different refractive indices at different heights of grating ridges 1822. The converging or diverging light beam may be a single light beam after being focused by a lens, or may be multiple beams focused by multiple lenses, such as a multiple converging beams 1840 formed by a microlens array 1830.

In some embodiments as shown in FIG. 18, surface-relief structure 1800 may be apodized by converging beams 1840. For example, converging beams 1840 may converge at the middle of each grating ridge 1822 in the thickness direction (e.g., z direction), and thus may have the highest intensity at the middle of each grating ridge 1822. The light intensity may decrease at heights above or below the middle of each grating ridge 1822. Therefore, the refractive index modulation may be the highest in the middle of each grating ridge 1822, and may gradually decrease in z and −z directions. In various embodiments, converging beams 1840 may converge at different heights of each grating ridge 1822 such that the maximum refractive index modulation may occur at a desired height of grating ridges 1822.

FIG. 19A illustrates an example of an imprinted slanted surface-relief structure 1900 with the refractive index modulation varying in the thickness direction according to certain embodiments. Surface-relief structure 1900 may include a base layer 1910 and a grating region 1920. Base layer 1910 and grating region 1920 may include a same material, such as an organic resin material for nanoimprinting as described above. Grating region 1920 may include a straight or slanted surface-relief grating that may be uniform or non-uniform across grating region 1920. Grating region 1920 may include a plurality of slanted grating ridges 1922 that may have the same or different width, depth, slant angle, and the like. Because the surface-relief grating is imprinted using a same substantially uniformly mixed material, the refractive index modulation (e.g., $\Delta n$) of grating region 1920 may be the same across grating region 1920 after the nanoimprint lithography.

Surface-relief structure 1900 may be cured in multiple curing processes to form multiple layers of gratings having different refractive index modulations using converging light beams as described above. For example, in each curing process, the light beam may be focused differently, such that the height of the focusing or converging point of the light beam may be different in different curing processes. In one example, in the first curing process, the UV curing light beam may be focused such that the maximum intensity of the light beam is at regions 1922a of grating ridges 1922 to change the refractive index at regions 1922a by a first amount. The light intensity may be low at other regions, such as below a threshold value, and thus may not change the refractive index in other regions. In the second curing process, the UV curing light beam may be focused such that the maximum intensity of the light beam is at regions 1922b of grating ridges 1922 to change the refractive index at regions 1922b by a second amount. In the third curing process, the UV curing light beam may be focused such that the maximum intensity of the light beam is at regions 1922c of grating ridges 1922 to change the refractive index at regions 1922c by a third amount. In the fourth curing process, the UV curing light beam may be focused such that the maximum intensity of the light beam is at regions 1922d of grating ridges 1922 to change the refractive index at regions 1922d by a fourth amount. In this way, multiple vertically multiplexed gratings may be formed in surface-relief structure 1900.

FIG. 19B illustrates an example of an imprinted slanted surface-relief structure 1950 with the refractive index modulation varying in the thickness direction (e.g., z direction) and the length and/or width directions (e.g., x and/or y directions) according to certain embodiments. FIG. 19B illustrates that the techniques for varying the refractive index in the thickness direction described above with respect to FIGS. 18 and 19 may be used in combination with techniques for varying the refractive index in the length and/or width directions of the surface-relief structures described above with respect to FIGS. 13B-17.

In the example shown in FIG. 19B, surface-relief structure 1950 may be imprinted using a NIL process and may include a base layer 1930 and a grating region 1940. Base layer 1930 and grating region 1940 may include a same material, such as an organic resin material for nanoimprinting as described above. Grating region 1940 may include a straight or slanted surface-relief grating that may be uniform or non-uniform across grating region 1940. Grating region 1940 may include a plurality of slanted grating ridges 1942 that may have the same or different width, depth, slant angle, and the like. Because the surface-relief grating is imprinted using a same substantially uniformly mixed material, the refractive index modulation (e.g., $\Delta n$) of grating region 1940 may be the same across grating region 1940 after the nanoimprint lithography.

Surface-relief structure 1950 may be cured in multiple curing processes to form multiple layers of gratings having different refractive index modulations using converging light beams. In each curing process, a mask 1960 that includes substantially transparent regions 1962 and opaque regions 1964 may be used to mask some regions of surface-relief structure 1950, such that these regions of surface-relief structure 1950 may not be cured to change the refractive index during these curing processes. In each curing process, the light beam may be focused differently, such that the height of the focusing or converging point of the light beam may be different in different curing processes.

For example, in the first curing process, the UV curing light beam may be focused such that the maximum intensity of the light beam is at regions 1946a of grating ridges 1946 to change the refractive index at regions 1946a in some grating ridges (e.g., grating ridges 1946) by a first amount. The light intensity may be low at other regions, such as below a threshold value, and thus may not change the refractive index in other regions. In the second curing process, the UV curing light beam may be focused such that the maximum intensity of the light beam is at regions 1946b of grating ridges 1946 to change the refractive index at regions 1946b in some grating ridges (e.g., grating ridges 1946) by a second amount. In the third curing process, the UV curing light beam may be focused such that the maximum intensity of the light beam is at regions 1946c of grating ridges 1946 to change the refractive index at regions 1946c in some grating ridges (e.g., grating ridges 1946) by a third amount. In the fourth curing process, the UV curing light beam may be focused such that the maximum intensity of the light beam is at regions 1946d of grating ridges 1946 to change the refractive index at regions 1946d in some grating ridges (e.g., grating ridges 1946) by a fourth amount. In this way, multiple vertically and/or horizontally multiplexed gratings may be formed in surface-relief structure 1950.

Thus, the refractive index modulation of surface-relief structure 1950 may vary in both the thickness direction and the length and/or width directions. Other combinations of beam focusing depth, beam intensity profile, mask pattern, and the like, may also be used to achieve a desired refractive index modulation pattern or profile in the thickness, length, and width directions of the surface-relief structure.

Figure 20C:
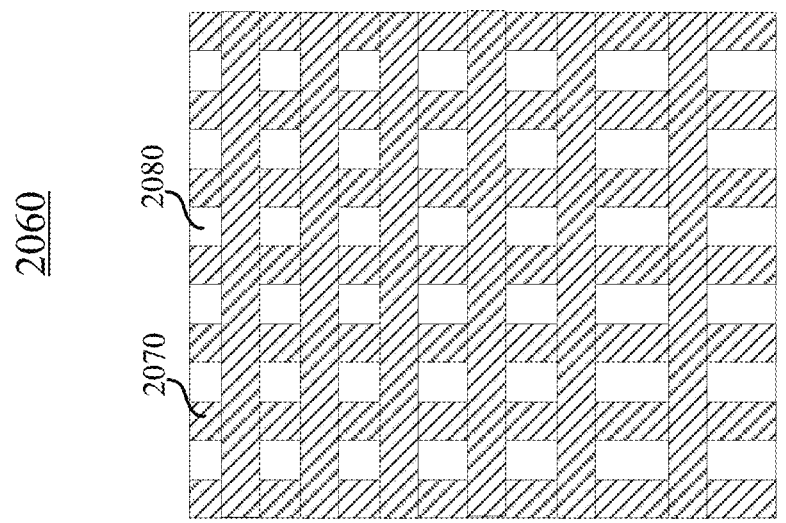
FIGS. 20A-20C illustrate examples of masks for patterning the refractive index modulation of an imprinted slanted surface-relief structure according to certain embodiments.
Figure 20B:
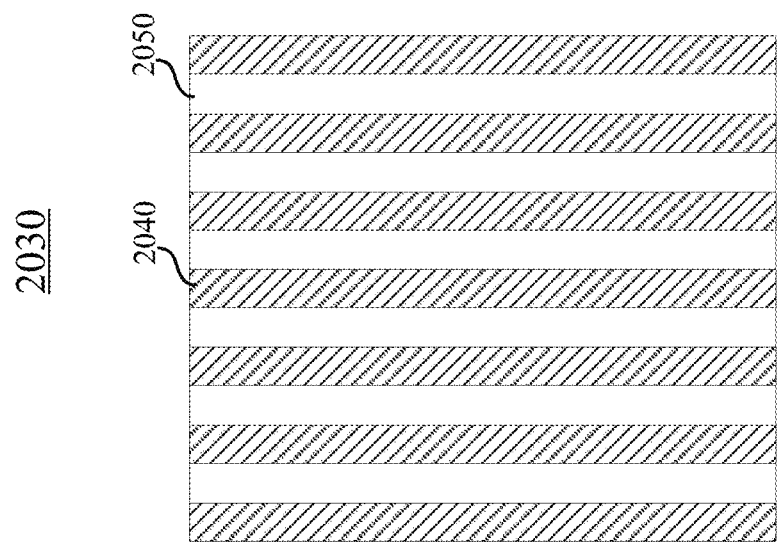
Figure 20A:
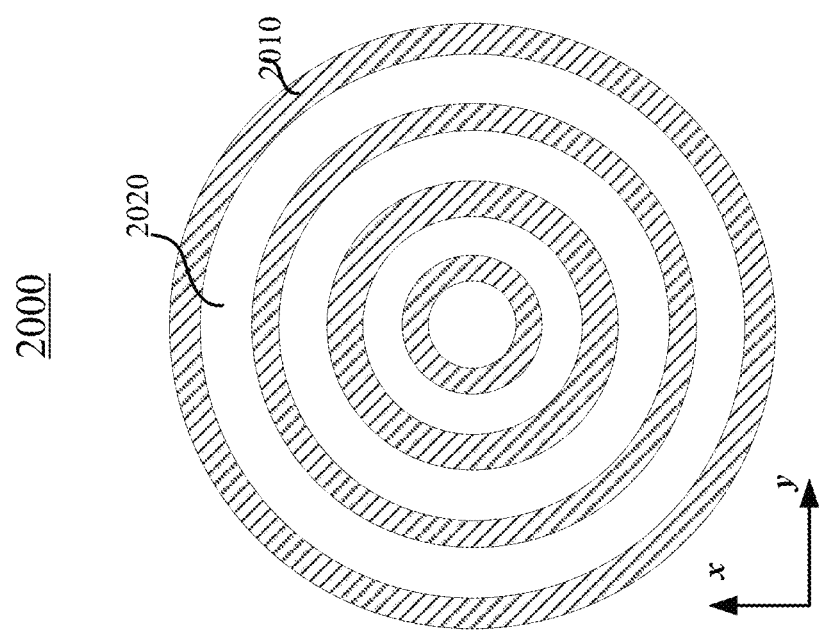

FIGS. 20A-20C illustrate examples of masks or light patterns for patterning the refractive index modulation of an imprinted slanted surface-relief structure according to certain embodiments. For example, in the example shown in FIG. 20A, a mask 2000 may include ring-shaped transparent regions 2020 and opaque regions 2010. In the example shown in FIG. 20B, a mask 2030 may include stripe-shaped transparent regions 2050 and opaque regions 2040 arranged in the y direction. In the example shown in FIG. 20C, a mask 2060 may include transparent regions 2080 and opaque regions 2070 arranged in the x and y directions. The examples shown in FIGS. 20A-20C are for illustration purposes only. In various embodiments, any other one-dimensional, two-dimensional, or three-dimensional pattern (e.g., a gray-scale mask) may be used. In some embodiments, a light pattern that may have bright regions and dark regions similar to the pattern shown in FIGS. 20A-20C may be formed by, for example, interfering beams or a diffractive optical element, rather than using a mask.

Figure 21:
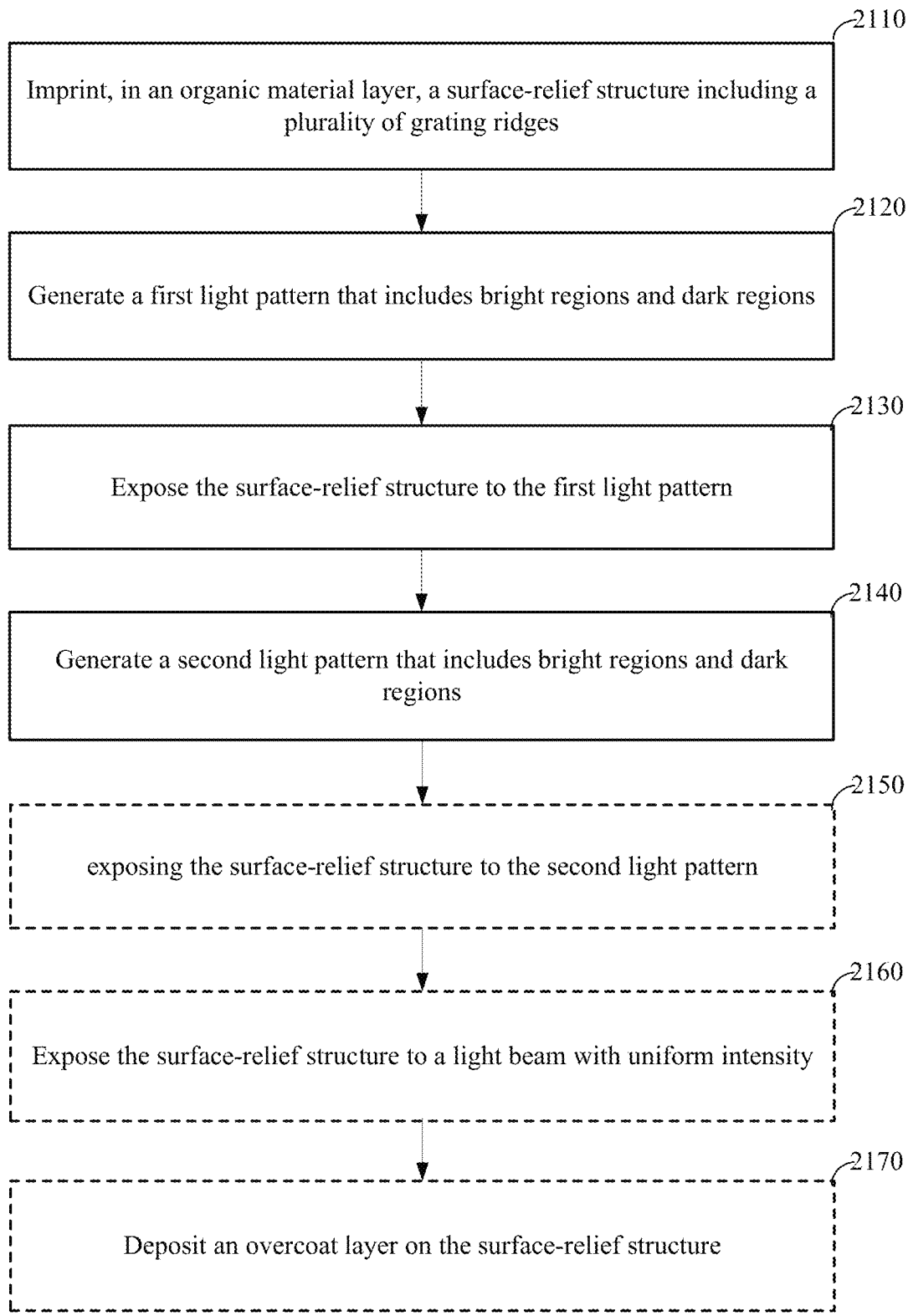
FIG. 21 is a flow chart illustrating an example of a method for fabricating a surface-relief grating with patterned refractive index modulation using nanoimprint lithography and selective curing according to certain embodiments.

FIG. 21 is a flow chart 2100 illustrating an example of a method for fabricating a surface-relief grating with patterned refractive index modulation using nanoimprint lithography and selective curing according to certain embodiments. At block 2110, a surface-relief structure including a plurality of grating ridges may be imprinted in an organic material layer as described above with respect to, for example, FIGS. 8A-11. The organic material layer may include a light-curable base resin that may include a support matrix and monomers, oligomers, or polymers dispersed in the support matrix. The organic material layer may also include polymerization initiating agents and nanoparticles having high refractive indices as described above with respect to FIG. 12. The organic material layer may be deposited on a substrate and may be pressed against by a stamp or mold.

At block 2120, a first light pattern that includes bright regions and dark regions may be generated, for example, illuminating a photomask or a diffractive optical device using a light beam having a uniform intensity in a cross-section of the light beam, or generating an interference pattern using two coherent light beams. An intensity of the light pattern may vary in one dimension, two dimensions, or three dimensions (e.g., gray scale), such as the thickness, length, or width direction of the surface-relief structure. In some embodiments, the light pattern may include collimated light beam or converging or diverging light beam.

At block 2130, the surface-relief structure imprinted at block 2110 may be exposed to the first light pattern. The first light pattern may polymerize the monomers in a set of grating ridges of the plurality of grating ridges in the bright regions and increase a refractive index of the set of grating ridges of the plurality of grating ridges in the bright regions due to the diffusion and polymerization of the monomers. The amount of refractive index change may depend on the exposure dosage and the concentration of monomers in the organic material layer. For example, the refractive index change caused by exposing the surface-relief structure to the first light pattern may be greater than 0.01.

Optionally, at block 2140, a second light pattern that includes bright regions and dark regions may be generated using techniques similar to the techniques for generating the first light pattern. The second light pattern may have bright regions different from the bright regions of the first light pattern. In some embodiments, the second light pattern may be generated using a same mask that is also used to generate the first light pattern but has a different shift or offset. Optionally, at block 2150, the surface-relief structure may be exposed to the second light pattern to modify the refractive index in different regions of the surface-relief structure based on the second light pattern. The exposure dosage for the second light pattern may be different from the exposure dosage at block 2130, and thus may cause a different amount of refractive index change.

Optionally, at block 2160, the surface-relief structure may be exposed to a light beam with uniform intensity to universally cure the surface-relief structure and polymerize remaining monomers in the organic material layer.

Optionally, at block 2170, the surface-relief structure may be over-coated with a material having a refractive index different from the plurality of grating ridges described above. For example, in some embodiments, a higher refractive index material, such as Hafnia, Titania, Tungsten oxide, Zirconium oxide, Gallium sulfide, Gallium nitride, Gallium phosphide, silicon, or a high refractive index polymer, may be used to over-coat the slanted grating and fill the gaps between the slanted grating ridges. In some embodiments, a lower refractive index material, such as silicon oxide, magnesium fluoride, porous silica, or fluorinated low index monomer (or polymer), and the like, may be used to over-coat the slanted grating and fill the gaps between the slanted grating ridges.

It is noted that the specific operations illustrated in FIG. 21 provide a particular method of making an imprinted surface-relief grating with non-uniform refractive index modulation according to various embodiments. Other sequences of operations may also be performed according to alternative embodiments. For example, alternative embodiments may perform the operations outlined above in a different order. Moreover, the individual steps illustrated in FIG. 21 may include multiple sub-steps that may be performed in various sequences as appropriate to the individual step. Furthermore, depending on the particular applications, additional operations may be added or some operations may be omitted.

Embodiments of the invention may be used to implement components of an artificial reality system or may be implemented in conjunction with an artificial reality system. Artificial reality is a form of reality that has been adjusted in some manner before presentation to a user, which may include, for example, a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, for example, create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

Figure 22:
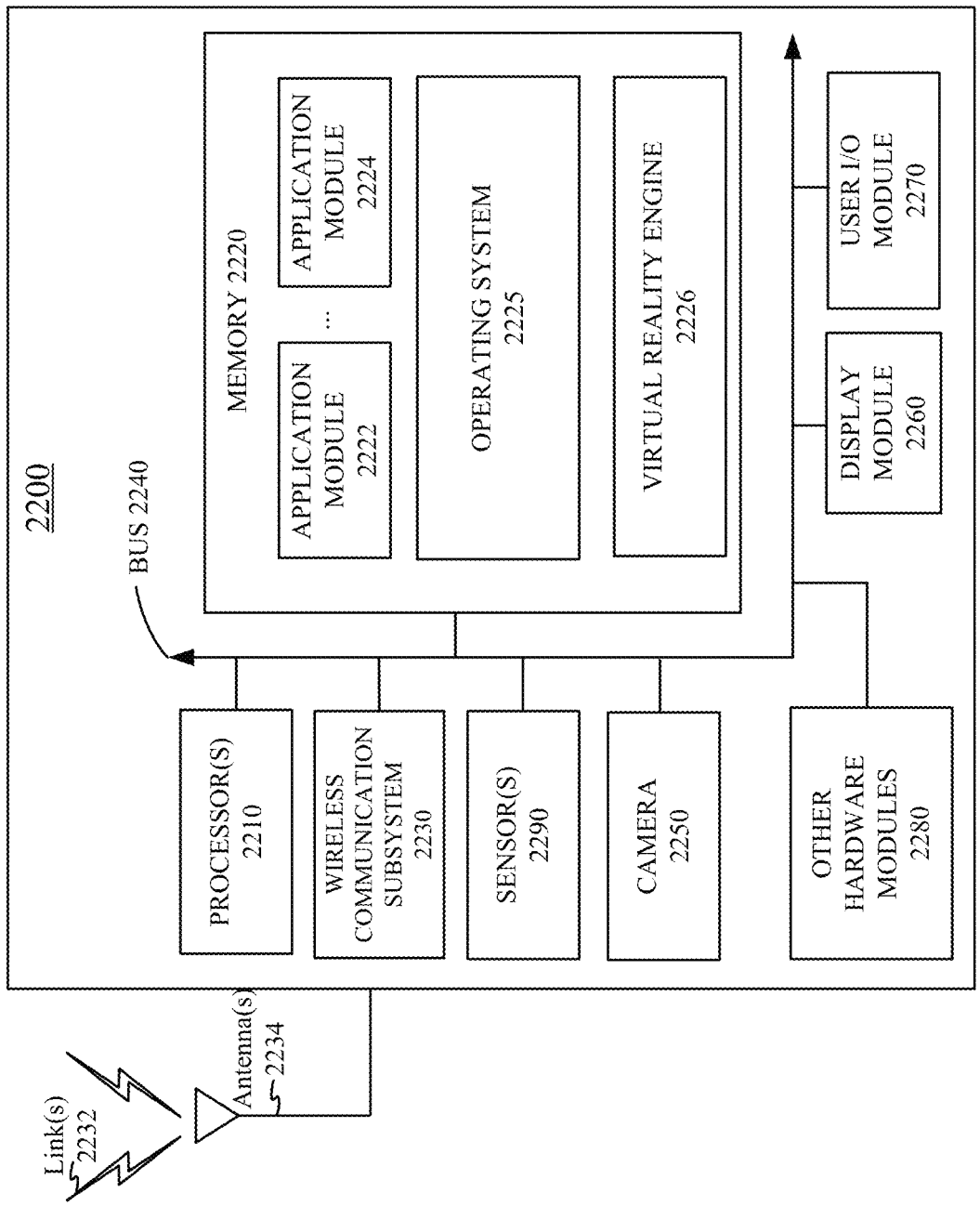
FIG. 22 is a simplified block diagram of an example of an electronic system of a near-eye display according to certain embodiments.

FIG. 22 is a simplified block diagram of an example electronic system 2200 of an example near-eye display (e.g., HMD device) for implementing some of the examples disclosed herein. Electronic system 2200 may be used as the electronic system of an HMD device or other near-eye displays described above. In this example, electronic system 2200 may include one or more processor(s) 2210 and a memory 2220. Processor(s) 2210 may be configured to execute instructions for performing operations at a number of components, and can be, for example, a general-purpose processor or microprocessor suitable for implementation within a portable electronic device. Processor(s) 2210 may be communicatively coupled with a plurality of components within electronic system 2200. To realize this communicative coupling, processor(s) 2210 may communicate with the other illustrated components across a bus 2240. Bus 2240 may be any subsystem adapted to transfer data within electronic system 2200. Bus 2240 may include a plurality of computer buses and additional circuitry to transfer data.

Memory 2220 may be coupled to processor(s) 2210. In some embodiments, memory 2220 may offer both short-term and long-term storage and may be divided into several units. Memory 2220 may be volatile, such as static random access memory (SRAM) and/or dynamic random access memory (DRAM) and/or non-volatile, such as read-only memory (ROM), flash memory, and the like. Furthermore, memory 2220 may include removable storage devices, such as secure digital (SD) cards. Memory 2220 may provide storage of computer-readable instructions, data structures, program modules, and other data for electronic system 2200. In some embodiments, memory 2220 may be distributed into different hardware modules. A set of instructions and/or code might be stored on memory 2220. The instructions might take the form of executable code that may be executable by electronic system 2200, and/or might take the form of source and/or installable code, which, upon compilation and/or installation on electronic system 2200 (e.g., using any of a variety of generally available compilers, installation programs, compression/decompression utilities, etc.), may take the form of executable code.

In some embodiments, memory 2220 may store a plurality of application modules 2222 through 2224, which may include any number of applications. Examples of applications may include gaming applications, conferencing applications, video playback applications, or other suitable applications. The applications may include a depth sensing function or eye tracking function. Application modules 2222-2224 may include particular instructions to be executed by processor(s) 2210. In some embodiments, certain applications or parts of application modules 2222-2224 may be executable by other hardware modules 2280. In certain embodiments, memory 2220 may additionally include secure memory, which may include additional security controls to prevent copying or other unauthorized access to secure information.

In some embodiments, memory 2220 may include an operating system 2225 loaded therein. Operating system 2225 may be operable to initiate the execution of the instructions provided by application modules 2222-2224 and/or manage other hardware modules 2280 as well as interfaces with a wireless communication subsystem 2230 which may include one or more wireless transceivers. Operating system 2225 may be adapted to perform other operations across the components of electronic system 2200 including threading, resource management, data storage control and other similar functionality.

Wireless communication subsystem 2230 may include, for example, an infrared communication device, a wireless communication device and/or chipset (such as a Bluetooth® device, an IEEE 802.11 device, a Wi-Fi device, a WiMax device, cellular communication facilities, etc.), and/or similar communication interfaces. Electronic system 2200 may include one or more antennas 2234 for wireless communication as part of wireless communication subsystem 2230 or as a separate component coupled to any portion of the system. Depending on desired functionality, wireless communication subsystem 2230 may include separate transceivers to communicate with base transceiver stations and other wireless devices and access points, which may include communicating with different data networks and/or network types, such as wireless wide-area networks (WWANs), wireless local area networks (WLANs), or wireless personal area networks (WPANs). A WWAN may be, for example, a WiMax (IEEE 802.16) network. A WLAN may be, for example, an IEEE 802.11x network. A WPAN may be, for example, a Bluetooth network, an IEEE 802.15x, or some other types of network. The techniques described herein may also be used for any combination of WWAN, WLAN, and/or WPAN. Wireless communications subsystem 2230 may permit data to be exchanged with a network, other computer systems, and/or any other devices described herein. Wireless communication subsystem 2230 may include a means for transmitting or receiving data, such as identifiers of HMD devices, position data, a geographic map, a heat map, photos, or videos, using antenna(s) 2234 and wireless link(s) 2232. Wireless communication subsystem 2230, processor(s) 2210, and memory 2220 may together comprise at least a part of one or more of a means for performing some functions disclosed herein.

Embodiments of electronic system 2200 may also include one or more sensors 2290. Sensor(s) 2290 may include, for example, an image sensor, an accelerometer, a pressure sensor, a temperature sensor, a proximity sensor, a magnetometer, a gyroscope, an inertial sensor (e.g., a module that combines an accelerometer and a gyroscope), an ambient light sensor, or any other similar module operable to provide sensory output and/or receive sensory input, such as a depth sensor or a position sensor. For example, in some implementations, sensor(s) 2290 may include one or more inertial measurement units (IMUs) and/or one or more position sensors. An IMU may generate calibration data indicating an estimated position of the HMD device relative to an initial position of the HMD device, based on measurement signals received from one or more of the position sensors. A position sensor may generate one or more measurement signals in response to motion of the HMD device. Examples of the position sensors may include, but are not limited to, one or more accelerometers, one or more gyroscopes, one or more magnetometers, another suitable type of sensor that detects motion, a type of sensor used for error correction of the IMU, or some combination thereof. The position sensors may be located external to the IMU, internal to the IMU, or some combination thereof. At least some sensors may use a structured light pattern for sensing.

Electronic system 2200 may include a display module 2260. Display module 2260 may be a near-eye display, and may graphically present information, such as images, videos, and various instructions, from electronic system 2200 to a user. Such information may be derived from one or more application modules 2222-2224, virtual reality engine 2226, one or more other hardware modules 2280, a combination thereof, or any other suitable means for resolving graphical content for the user (e.g., by operating system 2225). Display module 2260 may use liquid crystal display (LCD) technology, light-emitting diode (LED) technology (including, for example, OLED, ILED, µLED, AMOLED, TOLED, etc.), light emitting polymer display (LPD) technology, or some other display technology.

Electronic system 2200 may include a user input/output module 2270. User input/output module 2270 may allow a user to send action requests to electronic system 2200. An action request may be a request to perform a particular action. For example, an action request may be to start or end an application or to perform a particular action within the application. User input/output module 2270 may include one or more input devices. Example input devices may include a touchscreen, a touch pad, microphone(s), button(s), dial(s), switch(es), a keyboard, a mouse, a game controller, or any other suitable device for receiving action requests and communicating the received action requests to electronic system 2200. In some embodiments, user input/output module 2270 may provide haptic feedback to the user in accordance with instructions received from electronic system 2200. For example, the haptic feedback may be provided when an action request is received or has been performed.

Electronic system 2200 may include a camera 2250 that may be used to take photos or videos of a user, for example, for tracking the user's eye position. Camera 2250 may also be used to take photos or videos of the environment, for example, for VR, AR, or MR applications. Camera 2250 may include, for example, a complementary metal-oxide-semiconductor (CMOS) image sensor with a few millions or tens of millions of pixels. In some implementations, camera 2250 may include two or more cameras that may be used to capture 3-D images.

In some embodiments, electronic system 2200 may include a plurality of other hardware modules 2280. Each of other hardware modules 2280 may be a physical module within electronic system 2200. While each of other hardware modules 2280 may be permanently configured as a structure, some of other hardware modules 2280 may be temporarily configured to perform specific functions or temporarily activated. Examples of other hardware modules 2280 may include, for example, an audio output and/or input module (e.g., a microphone or speaker), a near field communication (NFC) module, a rechargeable battery, a battery management system, a wired/wireless battery charging system, etc. In some embodiments, one or more functions of other hardware modules 2280 may be implemented in software.

In some embodiments, memory 2220 of electronic system 2200 may also store a virtual reality engine 2226. Virtual reality engine 2226 may execute applications within electronic system 2200 and receive position information, acceleration information, velocity information, predicted future positions, or some combination thereof of the MD device from the various sensors. In some embodiments, the information received by virtual reality engine 2226 may be used for producing a signal (e.g., display instructions) to display module 2260. For example, if the received information indicates that the user has looked to the left, virtual reality engine 2226 may generate content for the HMD device that mirrors the user's movement in a virtual environment. Additionally, virtual reality engine 2226 may perform an action within an application in response to an action request received from user input/output module 2270 and provide feedback to the user. The provided feedback may be visual, audible, or haptic feedback. In some implementations, processor(s) 2210 may include one or more GPUs that may execute virtual reality engine 2226.

In various implementations, the above-described hardware and modules may be implemented on a single device or on multiple devices that can communicate with one another using wired or wireless connections. For example, in some implementations, some components or modules, such as GPUs, virtual reality engine 2226, and applications (e.g., tracking application), may be implemented on a console separate from the head-mounted display device. In some implementations, one console may be connected to or support more than one HMD.

In alternative configurations, different and/or additional components may be included in electronic system 2200. Similarly, functionality of one or more of the components can be distributed among the components in a manner different from the manner described above. For example, in some embodiments, electronic system 2200 may be modified to include other system environments, such as an AR system environment and/or an MR environment.

The methods, systems, and devices discussed above are examples. Various embodiments may omit, substitute, or add various procedures or components as appropriate. For instance, in alternative configurations, the methods described may be performed in an order different from that described, and/or various stages may be added, omitted, and/or combined. Also, features described with respect to certain embodiments may be combined in various other embodiments. Different aspects and elements of the embodiments may be combined in a similar manner. Also, technology evolves and, thus, many of the elements are examples that do not limit the scope of the disclosure to those specific examples.

Specific details are given in the description to provide a thorough understanding of the embodiments. However, embodiments may be practiced without these specific details. For example, well-known circuits, processes, systems, structures, and techniques have been shown without unnecessary detail in order to avoid obscuring the embodiments. This description provides example embodiments only, and is not intended to limit the scope, applicability, or configuration of the invention. Rather, the preceding description of the embodiments will provide those skilled in the art with an enabling description for implementing various embodiments. Various changes may be made in the function and arrangement of elements without departing from the spirit and scope of the present disclosure.

Also, some embodiments were described as processes depicted as flow diagrams or block diagrams. Although each may describe the operations as a sequential process, many of the operations may be performed in parallel or concurrently. In addition, the order of the operations may be rearranged. A process may have additional steps not included in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium. Processors may perform the associated tasks.

It will be apparent to those skilled in the art that substantial variations may be made in accordance with specific requirements. For example, customized or special-purpose hardware might also be used, and/or particular elements might be implemented in hardware, software (including portable software, such as applets, etc.), or both. Further, connection to other computing devices such as network input/output devices may be employed.

With reference to the appended figures, components that can include memory can include non-transitory machine-readable media. The term "machine-readable medium" and "computer-readable medium" may refer to any storage medium that participates in providing data that causes a machine to operate in a specific fashion. In embodiments provided hereinabove, various machine-readable media might be involved in providing instructions/code to processing units and/or other device(s) for execution. Additionally or alternatively, the machine-readable media might be used to store and/or carry such instructions/code. In many implementations, a computer-readable medium is a physical and/or tangible storage medium. Such a medium may take many forms, including, but not limited to, non-volatile media, volatile media, and transmission media. Common forms of computer-readable media include, for example, magnetic and/or optical media such as compact disk (CD) or digital versatile disk (DVD), punch cards, paper tape, any other physical medium with patterns of holes, a RAM, a programmable read-only memory (PROM), an erasable programmable read-only memory (EPROM), a FLASH-EPROM, any other memory chip or cartridge, a carrier wave as described hereinafter, or any other medium from which a computer can read instructions and/or code. A computer program product may include code and/or machine-executable instructions that may represent a procedure, a function, a subprogram, a program, a routine, an application (App), a subroutine, a module, a software package, a class, or any combination of instructions, data structures, or program statements.

Those of skill in the art will appreciate that information and signals used to communicate the messages described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Terms, "and" and "or" as used herein, may include a variety of meanings that are also expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein may be used to describe any feature, structure, or characteristic in the singular or may be used to describe some combination of features, structures, or characteristics. However, it should be noted that this is merely an illustrative example and claimed subject matter is not limited to this example. Furthermore, the term "at least one of" if used to associate a list, such as A, B, or C, can be interpreted to mean any combination of A, B, and/or C, such as A, AB, AC, BC, AA, ABC, AAB, AABBCCC, etc.

Further, while certain embodiments have been described using a particular combination of hardware and software, it should be recognized that other combinations of hardware and software are also possible. Certain embodiments may be implemented only in hardware, or only in software, or using combinations thereof. In one example, software may be implemented with a computer program product containing computer program code or instructions executable by one or more processors for performing any or all of the steps, operations, or processes described in this disclosure, where the computer program may be stored on a non-transitory computer readable medium. The various processes described herein can be implemented on the same processor or different processors in any combination.

Where devices, systems, components or modules are described as being configured to perform certain operations or functions, such configuration can be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes can communicate using a variety of techniques, including, but not limited to, conventional techniques for inter-process communications, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific embodiments have been described, these are not intended to be limiting. Various modifications and equivalents are within the scope of the following claims.

What is claimed is:

1. A surface-relief grating for a display system, the surface-relief grating comprising:
    a polymer layer including a plurality of grating ridges, wherein the plurality of grating ridges includes:
        a first set of grating ridges characterized by a first refractive index; and
        a second set of grating ridges interleaved with the first set of grating ridges and characterized by a second refractive index different from the first refractive index; and
    an overcoat material layer on the polymer layer and filling regions between the plurality of grating ridges,
    wherein the overcoat material layer includes an overcoat material characterized by a third refractive index different from the first refractive index and the second refractive index, such that the polymer layer includes a first region having the first refractive index, a second region having the second refractive index, and a third region between the first region and the second region and including the overcoat material of the overcoat material layer on the polymer layer.

2. The surface-relief grating of claim 1, wherein the plurality of grating ridges includes a slanted grating ridge.

3. The surface-relief grating of claim 1, wherein the plurality of grating ridges further includes:
    a third set of grating ridges interleaved with the first set of grating ridges and the second set of grating ridges and characterized by a fourth refractive index different from the first refractive index and the second refractive index.

4. The surface-relief grating of claim 1, wherein the first set of grating ridges and the second set of grating ridges are distributed in the polymer layer according to a one-dimensional pattern.

5. The surface-relief grating of claim 1, wherein the first set of grating ridges and the second set of grating ridges are distributed in the polymer layer according to a two-dimensional pattern.

6. The surface-relief grating of claim 1, wherein a difference between the first refractive index and the second refractive index is greater than 0.01.

7. The surface-relief grating of claim 1, wherein the polymer layer includes nanoparticles with refractive indices greater than 1.7.

8. The surface-relief grating of claim 1, wherein the plurality of grating ridges is imprinted in the polymer layer by a nanoimprint lithography process.

9. The surface-relief grating of claim 1, wherein the plurality of grating ridges is configured to couple light into or out of a waveguide in the display system.

10. A surface-relief grating for coupling light into or out of a waveguide display, the surface-relief grating comprising:
a polymer layer including a plurality of grating ridges that includes a first set of grating ridges, wherein:
each grating ridge in the first set of grating ridges includes a first layer having a first refractive index and a second layer having a second refractive index different from the first refractive index; and
the first layer and the second layer are parallel to each other; and
an overcoat material layer on the polymer layer and filling regions between the plurality of grating ridges, wherein the overcoat material layer includes an overcoat material characterized by a third refractive index different from the first refractive index and the second refractive index, such that the polymer layer includes:
a first lateral region including a grating ridge of the first set of grating ridges; and
a second lateral region in contact with both the first layer and the second layer of the grating ridge and including the overcoat material of the overcoat material layer on the polymer layer.

11. The surface-relief grating of claim 10, wherein:
each grating ridge in the first set of grating ridges includes a plurality of layers that includes the first layer and the second layer; and
a refractive index of each grating ridge in the first set of grating ridges is apodized in a direction along a thickness direction of the polymer layer.

12. The surface-relief grating of claim 10, wherein the plurality of grating ridges further comprises a second set of grating ridges interleaved with the first set of grating ridges, wherein the second set of grating ridges is characterized by a refractive index profile different from a refractive index profile of the first set of grating ridges.

13. The surface-relief grating of claim 10, wherein the first set of grating ridges includes a slanted grating ridge.

14. The surface-relief grating of claim 10, wherein the first layer and the second layer in each grating ridge of the first set of grating ridges have a same lateral size.

* * * * *